(12) United States Patent
Choi et al.

(10) Patent No.: US 12,308,044 B2
(45) Date of Patent: May 20, 2025

(54) ELECTRONIC DEVICE FOR RECORDING CONTENTS DATA AND METHOD OF THE SAME

(71) Applicant: SAMSUNG ELECTRONICS CO., LTD., Suwon-si (KR)

(72) Inventors: Jaeyoung Choi, Suwon-si (KR); Sangheon Kim, Suwon-si (KR); Byunghyuk Moon, Suwon-si (KR); Jinhyuk Woo, Suwon-si (KR); Eunji Lim, Suwon-si (KR); Banghyun Kwon, Suwon-si (KR); Inhyung Jung, Suwon-si (KR); Yeunwook Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 327 days.

(21) Appl. No.: 17/887,178

(22) Filed: Aug. 12, 2022

(65) Prior Publication Data
US 2023/0050178 A1 Feb. 16, 2023

Related U.S. Application Data

(63) Continuation of application No. PCT/KR2022/011817, filed on Aug. 9, 2022.

(30) Foreign Application Priority Data

Aug. 10, 2021 (KR) ........................ 10-2021-0105308

(51) Int. Cl.
*G10L 21/055* (2013.01)
*G10L 19/022* (2013.01)

(52) U.S. Cl.
CPC .......... *G10L 21/055* (2013.01); *G10L 19/022* (2013.01)

(58) Field of Classification Search
CPC . G10L 21/055; G10L 19/022; H04N 21/4348; H04N 21/43072; G06F 3/0484; H04L 65/601
See application file for complete search history.

(56) References Cited

U.S. PATENT DOCUMENTS

| 6,310,652 B1 * | 10/2001 | Li ........................... G10L 21/04 375/364 |
| 6,587,635 B1 * | 7/2003 | Subramanian ......... H04N 5/783 386/E5.052 |

(Continued)

FOREIGN PATENT DOCUMENTS

| CA | 3051511 A1 | 3/2016 |
| CN | 104581346 A | 4/2015 |

(Continued)

OTHER PUBLICATIONS

Search Report and Written Opinion dated Nov. 10, 2022 issued in International Patent Application No. PCT/KR2022/011817.

(Continued)

*Primary Examiner* — Paras D Shah
*Assistant Examiner* — Nadira Sultana
(74) *Attorney, Agent, or Firm* — NIXON & VANDERHYE P.C.

(57) ABSTRACT

An electronic device according to various embodiments of the disclosure includes: a display configured to output image data of content based on execution of an application, a sound output module comprising circuitry configured to output audio data of the content, and a processor adaptively connected to the display and the sound output module, wherein the processor is configured to: identify a schedule for sequentially receiving read tasks (RTs) at a specified time interval to encode audio segments sequentially input in a specified size into an audio buffer from the audio data, and control time points at which the RTs are called, based on at (Continued)

least one of a situation in which the RTs are received according to the schedule and an audio buffer state and encode the audio segments corresponding to the RTs received at the controlled time points.

17 Claims, 25 Drawing Sheets

(56) References Cited

U.S. PATENT DOCUMENTS

| | | | |
|---|---|---|---|
| 8,306,386 B2 * | 11/2012 | Hashimoto | H04N 9/8042 |
| | | | 386/239 |
| 9,197,872 B2 | 11/2015 | Bradley et al. | |
| 9,218,109 B2 * | 12/2015 | Mochinaga | G06F 3/0484 |
| 9,504,918 B2 * | 11/2016 | Tsukagoshi | H04N 21/4516 |
| 9,736,522 B2 * | 8/2017 | Kim | H04N 21/43072 |
| 10,133,541 B2 | 11/2018 | Seo | |
| 10,681,397 B2 * | 6/2020 | Haberman | H04N 21/4348 |
| 10,878,830 B2 | 12/2020 | Lecomte et al. | |
| 2002/0152083 A1 * | 10/2002 | Dokic | H04H 20/82 |
| | | | 704/500 |
| 2008/0145032 A1 | 6/2008 | Lindroos et al. | |
| 2009/0245758 A1 | 10/2009 | Kodama et al. | |
| 2012/0207225 A1 * | 8/2012 | Jeong | H04N 21/242 |
| | | | 375/E7.198 |
| 2013/0004146 A1 | 1/2013 | Kaneko et al. | |
| 2013/0222699 A1 | 8/2013 | Wang et al. | |
| 2014/0297293 A1 | 10/2014 | Heuberger et al. | |
| 2017/0147282 A1 | 5/2017 | Seo | |
| 2017/0243615 A1 | 8/2017 | Tabak | |
| 2018/0063580 A1 | 3/2018 | Wittke | |
| 2018/0302588 A1 | 10/2018 | Lim et al. | |
| 2019/0342590 A1 | 11/2019 | Haberman et al. | |
| 2020/0382828 A1 | 12/2020 | Chen | |

FOREIGN PATENT DOCUMENTS

| | | | |
|---|---|---|---|
| CN | 105744334 A | * 7/2016 | |
| CN | 108881767 | 11/2018 | |
| CN | 109286601 A | * 1/2019 | H04L 65/601 |
| CN | 110300322 | 10/2019 | |
| CN | 111314724 | 6/2020 | |
| CN | 112114733 | 12/2020 | |
| JP | 2005-318480 | 11/2005 | |
| JP | 2011-521483 | 7/2011 | |
| JP | 2013-012284 | 1/2013 | |
| JP | 2018-533233 | 11/2018 | |
| KR | 10-2014-0091595 | 7/2014 | |
| KR | 10-2017-0047297 | 5/2017 | |
| KR | 10-2017-0060409 | 6/2017 | |
| KR | 10-1849749 | 5/2018 | |
| KR | 10-2019-0043151 | 4/2019 | |
| KR | 10-2019-0063568 | 6/2019 | |

OTHER PUBLICATIONS

Extended European Search Report dated Sep. 16, 2024 for EP Application No. 22856160.1.

* cited by examiner

ELECTRONIC DEVICE FOR RECORDING CONTENTS DATA AND METHOD OF THE SAME

CROSS-REFERENCE TO RELATED APPLICATIONS

This application is a continuation of International Application No. PCT/KR2022/011817 designating the U.S. filed on Aug. 9, 2022, in the Korean Intellectual Property Receiving Office and claiming priority to Korean Patent Application No. 10-2021-0105308, filed on Aug. 10, 2021, in the Korean Intellectual Property Office, the disclosures of which are incorporated by reference herein in their entireties.

BACKGROUND

Field

The disclosure relates to an electronic device for recording content data and, for example, an electronic device for synchronizing audio and video data when content data is recorded.

Description of Related Art

With the development of technologies, needs to record content reproduced using electronic devices have increased. For example, the electronic device provides a function of recording various pieces of video and audio data displayed on a display in real time. For example, the electronic device can be connected to a content server or another electronic device through a communication technology, and record content reproduced in real time while streaming and reproducing the content from the connected server or another device.

When content reproduced in an electronic device is recorded, audio information may be lost and thus audio and video data may not be synchronized.

SUMMARY

Embodiments of the disclosure provide a method of, when content reproduced in the electronic device is reproduced, synchronizing audio and video data, and an electronic device thereof.

An electronic device according to various example embodiments disclosed herein includes: a display configured to output image data of content based on execution of an application, a sound output module comprising circuitry configured to output audio data of the content, and a processor adaptively connected to the display and the sound output module, wherein the processor is configured to: identify a schedule for sequentially receiving read tasks (RTs) at a specified time interval to encode audio segments sequentially input in a specified size into an audio buffer from the audio data; and control time points at which the RTs are called, based on at least one of the RTs being received according to the schedule and an audio buffer state; and encode the audio segments corresponding to the RTs received at the controlled time points.

A method of operating an electronic device according to various example embodiments disclosed herein includes: identifying a schedule for sequentially receiving read tasks (RTs) at a specified time interval to encode audio segments sequentially input in a specified size into an audio buffer from audio data of content based on execution of an application, identifying at least one of the RTs being received according to the schedule and an audio buffer state, and controlling time points at which the RTs are called, based on at least one of the RTs being received according to the schedule and the audio buffer state.

According to various example embodiments, when content reproduced in an electronic device is recorded, it is possible to synchronize audio and video data by performing audio encoding according to an absolute time.

According to various example embodiments, when content reproduced in the electronic device is recorded, it is possible to synchronize audio and video data by controlling a time point at which a task for audio encoding is called and performing audio encoding according to an absolute time even when audio data is lost or the task call is delayed.

Further, various effects directly or indirectly detected through the disclosure can be provided.

BRIEF DESCRIPTION OF THE DRAWINGS

In connection with a description of drawings, the same or similar reference numerals may be used for the same or similar elements. Further, the above and other aspects, features and advantages of certain embodiments of the present disclosure will be more apparent from the following detailed description, taken in conjunction with the accompanying drawings, in which.

DETAILED DESCRIPTION

Figure 1:
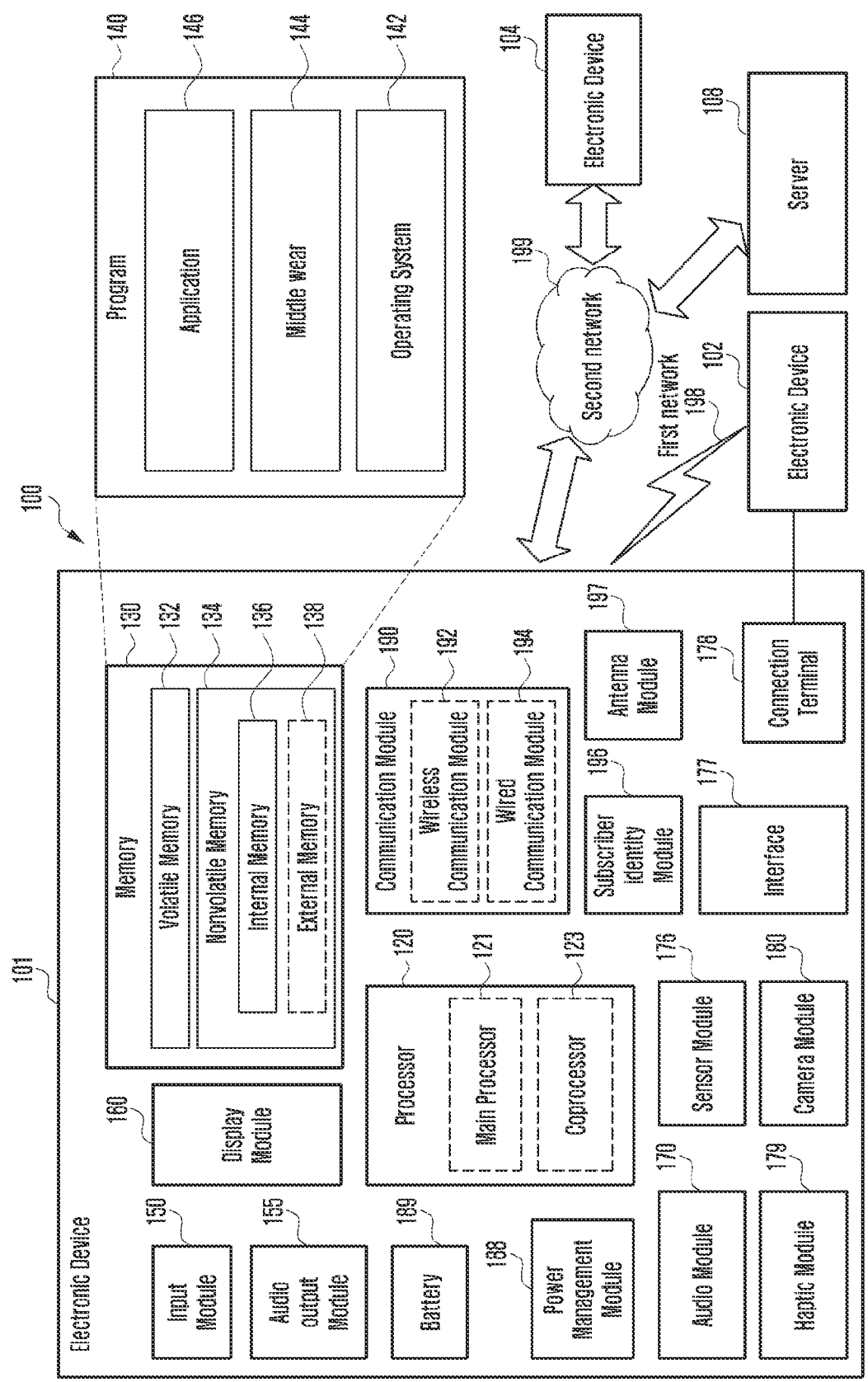
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
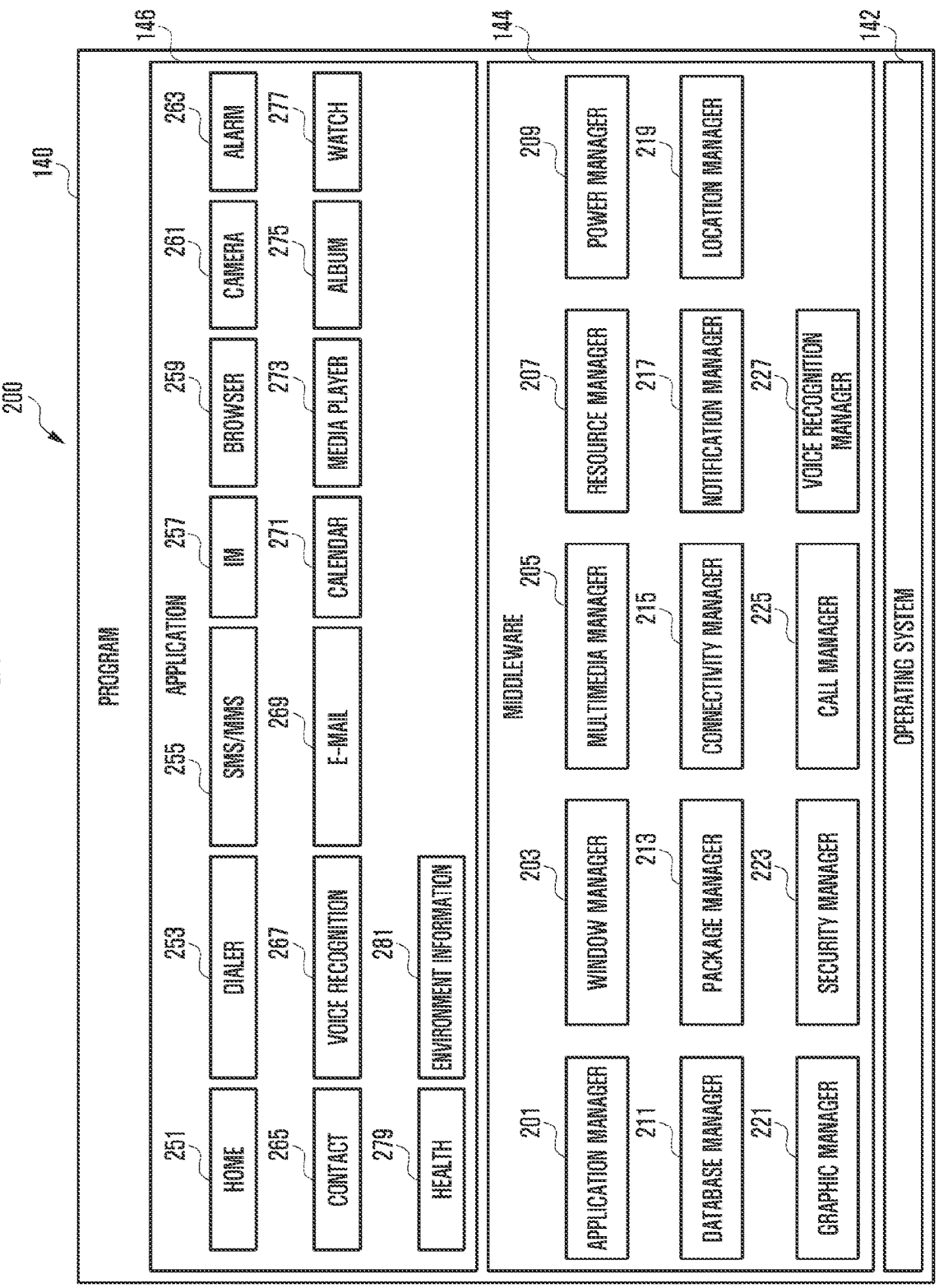
FIG. 2 is a block diagram illustrating a program according to various embodiments.

FIG. 2 is a block diagram 200 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display module or a camera module of the external electronic device). The device management application, additionally or alternatively, may support installation, delete, or update of an application running on the external electronic device.

Figure 3:
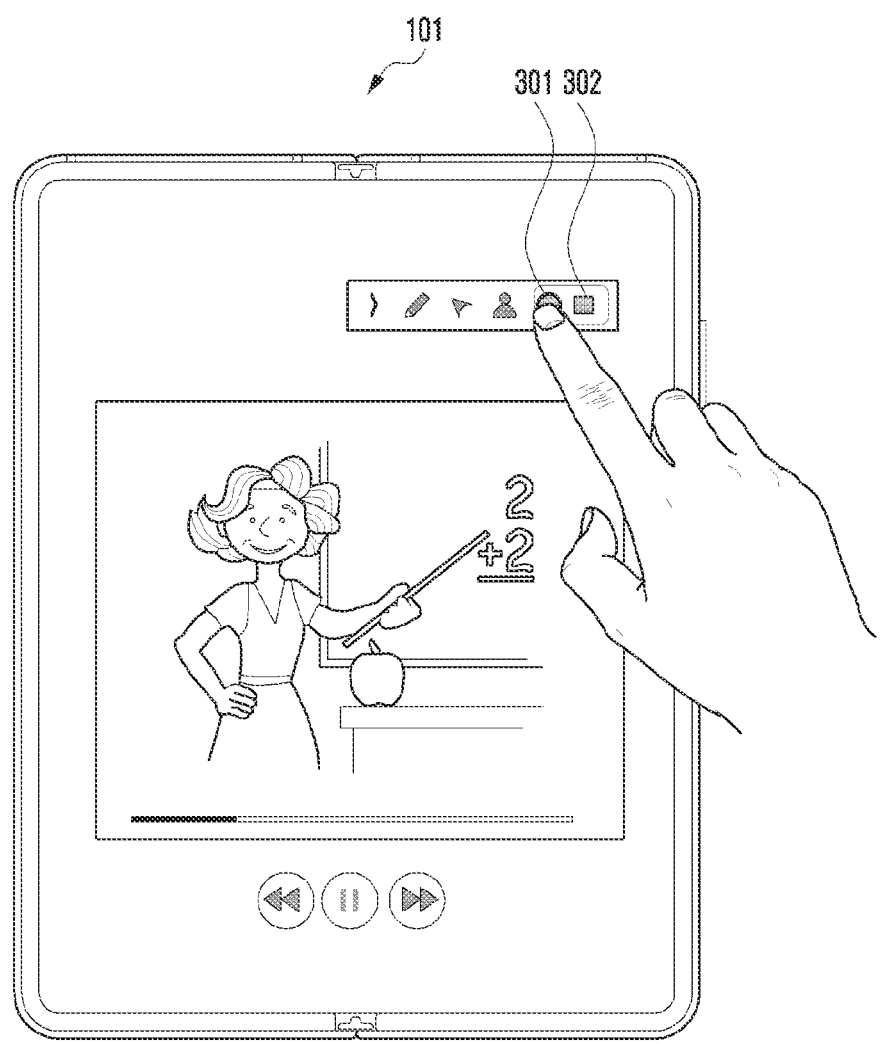
FIG. 3 is a diagram illustrating an example in which an electronic device records content according to various embodiments.

FIG. 3 is a diagram illustrating an example in which an electronic device (for example, the electronic device 101 of FIG. 1) records content according to various embodiments.

The electronic device 101 according to various embodiments may reproduce various pieces of content. For example, the electronic device 101 may reproduce a video. For example, the video may be streamed from another electronic device (for example, the server 108 or the electronic device 102 or 104 of FIG. 1).

According to various embodiments, the electronic device 101 may provide a screen recording function. For example, all pieces of content currently reproduced in the electronic device 101 can be recorded according to the screen recording function. Content recorded according to the screen recoding function may include password, payment information, images, messages, voices, media audio data, microphone audio data, and/or silent data, but is not limited thereto and may include various pieces of information provided by the electronic device 101 through a display and/or audio input/output.

Referring to FIG. 3, a video reproduced by the electronic device 101 may be recorded according to the screen recording function. When a video is being reproduced in the electronic device 101, for example, through a menu provided according to the screen recording function, the reproduced video may be recorded according to selection of a recording button 301 and the recording of the video may be stopped according to selection of a stop button 302.

According to an embodiment, even though a task call for recording reproduced content is delayed or some pieces of audio information are lost due to influence by various processes performed in the electronic device 101, audio data and video data can be synchronized according to the performance of audio data encoding and timestamp generation according to an absolute time reference.

According to an embodiment, in various problem situations like a task is delayed by various processes performed in the electronic device 101 or recording is temporarily stopped and started again, it is possible to synchronize audio and video data by determining a task call time point to and control an encoding time point in order to sequentially encode audio data according to the absolute time reference.

Figure 4:
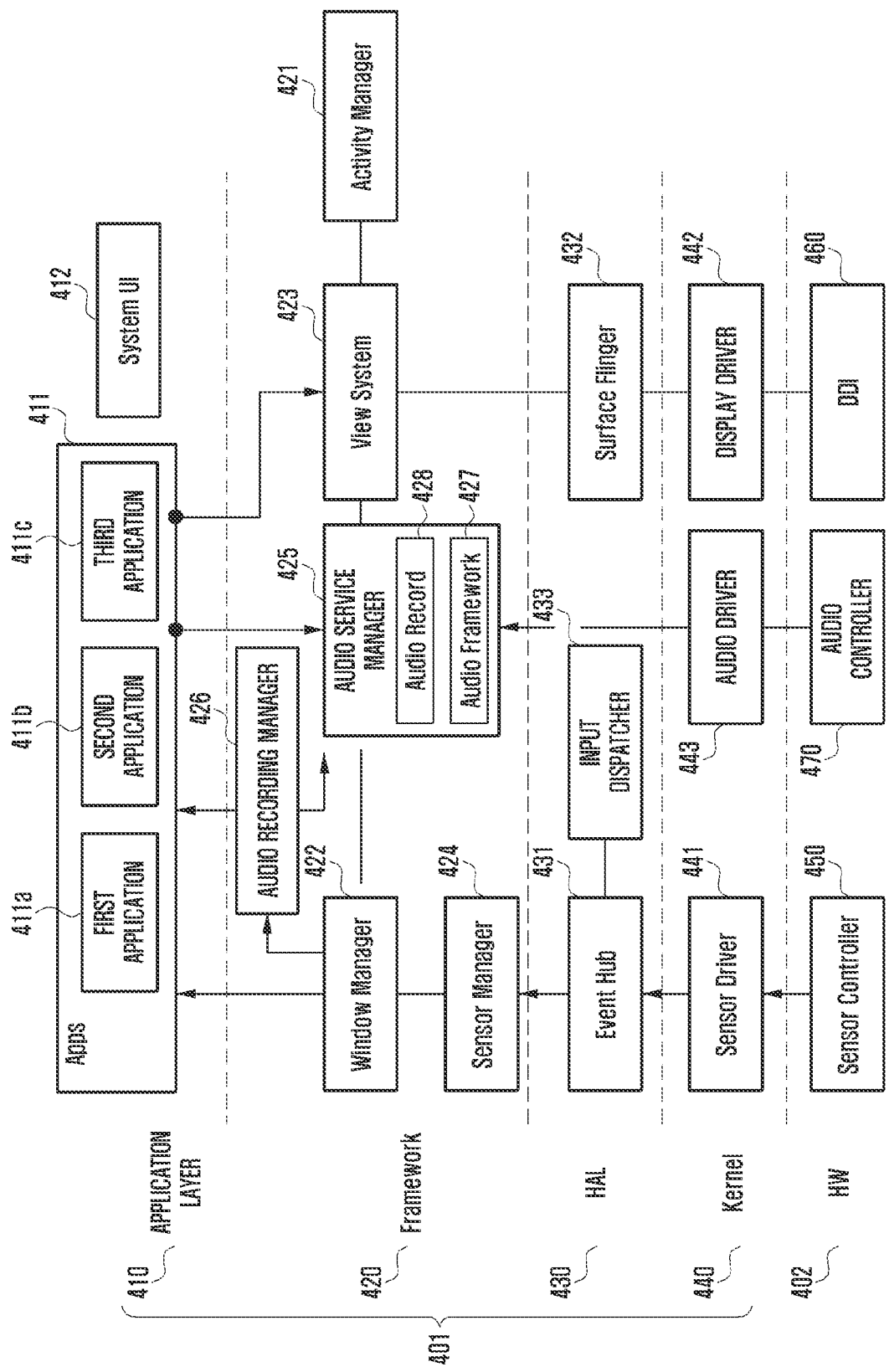
FIG. 4 is a diagram illustrating an example hierarchical architecture of the electronic device according to various embodiments.

FIG. 4 is a diagram illustrating an example hierarchical architecture of an electronic device (for example, the electronic device 101 of FIG. 1) according to various embodiments.

Referring to FIG. 4, a description of elements overlapping those in FIG. 2 may be omitted or simplified. Referring to FIG. 4, the electronic device 101 may include software 401 and hardware 402. The software 401 (for example, the program 140 of FIG. 1) may be loaded to the volatile memory 132 from the nonvolatile memory 134 and executed by the processor 120. The software 401 may include an application layer 410, a framework 420, a hardware abstraction layer (HAL) 430, and/or kernel 440. The hardware 402 may include a sensor controller (e.g., including sensor control circuitry) 450, a display driver integrated circuit(IC) (DDI) 460, and/or an audio controller (e.g., including audio control circuitry) 470.

The application layer 410 (for example, the applications 146 of FIG. 1 or FIG. 2) may include at least one application 411 (for example, a first application 411a, a second application 411b, and a third application 411c) which can be executed by the processor 120, and/or a system UI 412. At least one application 411 may include an Internet browser, a video application, and/or a game, and the type thereof is not limited and is various. For example, at least one application 411 may include a reproduction application or a screen recording application. The system user interface (UI) 412 may be an application for configuring a plurality of graphic user interface (GUI) screens implemented in the electronic device 101 such as a notification bar and/or a quick view.

The framework 420 (for example, the middleware 144 of FIG. 1 or FIG. 2) may provide various functions to at least one application 411 such that functions or information provided from one or more resources of the electronic device 101 can be used by at least one application 411. The framework 420 may include an activity manager 421, a window manager 422, a view system 423, a sensor manager 424, an audio service manager 425, or an audio recording manager (ARM) 426.

The activity manager 421 may control a life cycle and an activity of the application layer 410. The window manager 422 may manage one or more GUI resources used in the screen. The view system 423 may be a set of expandable views used for generating a user interface of the application 411. The sensor manager 424 may provide data generated by a sensor (for example, the sensor module 176 of FIG. 1) to the applications 411 so that the applications 411 can use the data. The audio service manager 425 may detect one or more formats required for producing audio files and encode or decode the audio file using a codec suitable for the format selected therefrom.

The audio recording manager 426 may support a function of recording content reproduced in the electronic device 101 as the screen recording application is executed and the screen recording function is performed. In an embodiment, the audio recording manager 426 may identify a task schedule for encoding audio data according to execution of the screen recording application, identify reception of a task call (read the task) on the basis of the schedule, and interwork with the audio service manager 425 to encode the audio data. For example, the audio recording manager 426 may identify whether task calls are received on the basis of the task schedule and/or orders of the read task calls, output the task call on time or a controlled time point, and support a function of the audio service manager 425 to perform the audio encoding. For example, the audio recording manager 426 may identify whether audio segments, to be recorded, are received by an audio buffer through the audio service manager 425. The audio buffer may be included in, for example, the processor 120 or the memory 130 of FIG. 1. The audio framework 427 may receive the audio segment to be recorded and store the same in the audio buffer. The audio recording framework 428 may allow the audio segments to be encoded in the order of being stored in the audio buffer. For example, the audio recording manager 426 may identify reception of task calls and reception of audio segments on the basis of the schedule, output the task call at a time point determined on the basis thereof, and support a function of the audio recording framework 428 to encode the audio segment to be recorded. The audio recording manager 426 may receive some functions (for example, task call according to a schedule for audio encoding) from the applications 411.

The HAL 430 may be an abstracted layer between the hardware 402 and the software 401. The HAL 430 may include an event hub 431 for providing an interface that standardizes an event generated by an input dispatcher 433 or the sensor. The input dispatcher 433 may perform a function of determining an application to provide the generated event. The HAL 430 may include a surface flinger 432. The service flinger 432 may perform a function of providing an execution screen to be displayed on the display among execution screens generated by the application and, when a display configuration is changed, make a request for processing a change in resolution and density to the application 411 according to the changed display configuration.

The kernel 440 (for example, the operating system 142 of FIG. 1 or FIG. 2) may include various drivers for driving various hardware components included in the electronic device. For example, the kernel 440 may include a sensor driver 441 for driving the sensor controller 450 configured to control the sensor, a display driver 442 for driving the DDI 460 configured to control a display panel, and/or an audio driver 443 for driving the audio controller 470 configured to control an audio output device through a wireless communication circuit (for example, the wireless communication module 192 of FIG. 1).

According to an example embodiment, an electronic device (for example, the electronic device 101 of FIG. 1) may include: a display (for example, the display module 160 of FIG. 1), configured to output image data of content based on execution of an application, a sound output module comprising circuitry (for example, the sound output module 155 of FIG. 1) configured to output audio data of the content, and a processor (for example, the processor 120 of FIG. 1) adaptively connected to the display and the sound output module, wherein the processor may be configured to: identify a schedule for sequentially receiving read tasks (RTs) at a specified time interval to encode audio segments sequentially input in a specified size into an audio buffer from the audio data, and control time points at which the RTs are called, based on at least one of the RTs being received according to the schedule and an audio buffer state; and encode the audio segments corresponding to the RTs received at the controlled time points. Hereinafter, RT is an example of a command received by the processor to performing a specified task, and the various embodiment may include another type of task command and not limited to RT.

According to an example embodiment, the processor may be configured to: generate time stamps of the encoded audio segments according to an absolute time reference based on orders of the RTs output at the specified time interval according to the schedule for encoding the audio data.

According to an example embodiment, the processor may be configured to: identify whether there are the audio segments in the audio buffer at the time point at which the RT is received, and control the time points at which the RT is called before a time point at which a next RT scheduled after the RT is received, call the RT at the controlled time point, and attempt reception of the audio segments from the audio buffer.

According to an example embodiment, based on the audio segments not being received at the controlled time point, reception of the audio segments according to the call of the RT may be repeatedly attempted before the time point at which the next RT is received.

According to an example embodiment, based on the RT being received based on the schedule, the processor may be configured to: identify whether a previous RT scheduled before the RT is on standby and, based on the previous RT being on standby, control the time point at which the RT is called to be a time point after the time point at which the previous RT is called and make the RT stand by.

According to an example embodiment, based on the previous RT being called and performed while the RT is on standby, the processor may be configured to: control the time point at which the RT is called to have a time interval shorter than the specified time interval after the time point at which the previous task is performed.

According to an example embodiment, based on a time point at which a next RT according to the schedule is received arriving at the controlled time point at which the RT is called, the processor may be configured to control the time point at which the next RT is called to be a time point after the time point at which the RT is received.

Figure 5:
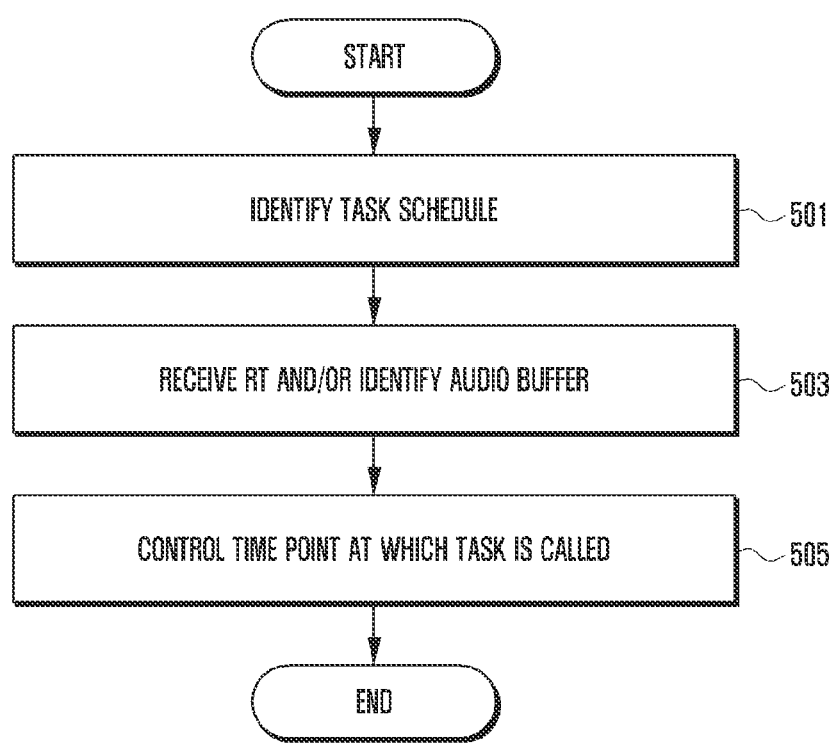
FIG. 5 is a flowchart illustrating an example operation of the electronic device according to various embodiments.

FIG. 5 is a flowchart illustrating an example operation of an electronic device (for example, the electronic device 101 of FIG. 1) according to various embodiments.

According to an embodiment, for example, a processor (for example, the processor 120 of FIG. 1) of the electronic device 101 may perform the screen recording function for content reproduced in the electronic device 101 on the basis of hierarchical architecture as implemented in FIG. 4 according to load and execution of a program (for example, the program 140 of FIG. 1 or FIG. 2).

According to an embodiment, audio data streams received for encoding of the audio data according to the performance of the screen recording function for the content may be divided into segments (hereinafter referred to as audio segments) in predetermined size and sequentially input into the audio buffer.

According to an embodiment, the audio buffer may be implemented to have a predetermined size (for example, the size enough to store 6 audio segments) in consideration of encoding efficiency and/or resource efficiency. The audio segments stored in the audio buffer may be output from the audio buffer in response to sequentially output task calls and then encoded. A task schedule (task scheduling) including the orders and intervals of the generation of task calls may be pre-designated and determined on the basis of various conditions for performing the screen recording function such as features of resources, content, and/or audio data of the electronic device 101.

According to an embodiment, the processor 120 of the electronic device 101 may identify a task schedule (task scheduling) according to the screen recording function in operation 501. For example, according to the task schedules, task calls for encoding audio segments input into the audio buffer may be periodically and sequentially generated and received (read) so that the received audio segments can be sequentially encoded according to the predetermined time period (for example, 10 ms) according to the screen recording function.

According to an embodiment, in spite of the schedules according to the screen recording function, task calls for encoding audio segments may not be generated and received at a predetermined time for any reason. For example, the task call may not be received at a predetermined time in the screen recording function. For example, processing of the task call may be delayed due to other processes within the electronic device 101 and thus the task call may not be generated and received at a predetermined time. For example, even though the task call is generated and received at a predetermined time, the task call may not be output and executed since it becomes have a lower priority by another task call according to the task schedule.

According to an embodiment, the processor 120 of the electronic device 101 may receive a read task (RT) and/or check the audio buffer to identify whether there is an audio segment in operation 503. For example, although the audio buffer is configured to temporarily store the sequentially input audio segments, the audio segments may not be received on time and thus there is no audio segment stored in the audio buffer in various situations since the audio data stream does not end.

According to an embodiment, the processor 120 of the electronic device 101 may determine a time point at which the task call is output on the basis of whether the task call is received according to the task call schedule and/or whether there is an audio segment in the audio buffer in operation 505. For example, when the task call is received on time but there is no audio segment in the audio buffer, the processor 120 may control the output time point to output the read task call at a time point after a predetermined time point by the schedule. For example, even when the task call has been received on time, the processor may identify whether there is a received previous task call on standby and control the time point at which the task call is output to be a time after the standby until the previously read task call is output. For example, when the task call is not received on time and is delayed and received, the processor may identify whether there is a previously read task call on standby and control the time point at which the task is called to be a time point after the delay or the standby until the previously read task call is output. For example, when the case in which the task call is not received on time is accumulated, a plurality of task calls are received thereafter, and the plurality of task calls are delayed, the processor may control time points at which the task calls are output such that the task calls are sequentially output more frequently by reducing a time interval between the task call time points.

Figure 6:
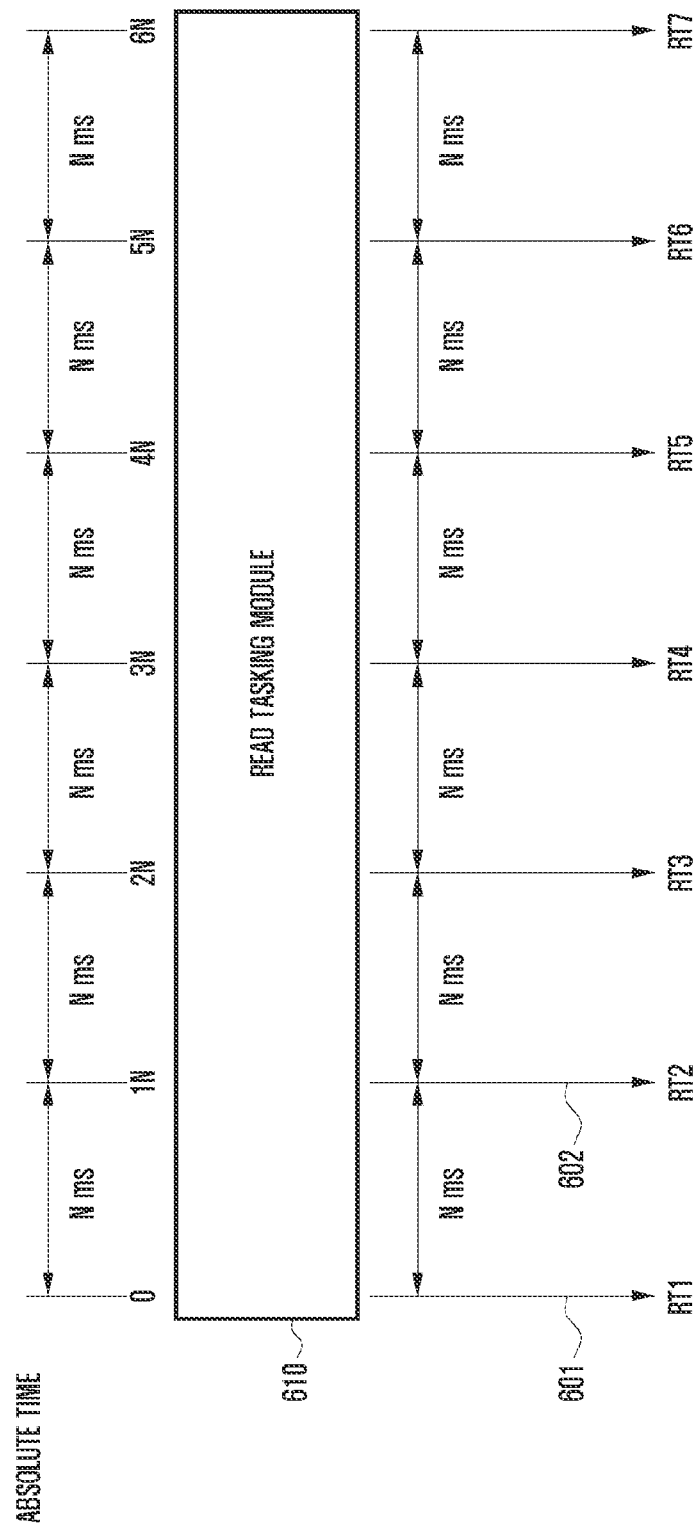
FIG. 6 is a diagram illustrating an example audio encoding operation of the electronic device according to various embodiments.

FIG. 6 is a diagram illustrating an example audio encoding operation of an electronic device (for example, the electronic device 101 of FIG. 1) according to various embodiments.

According to an embodiment, for example, a processor (for example, the processor 120 of FIG. 1) of the electronic device 101 may perform the screen recording function for content reproduced in the electronic device 101 on the basis of hierarchical architecture as implemented in FIG. 4 according to load and execution of a program (for example, the program 140 of FIG. 1 or FIG. 2).

A read task module (read task module) 610 according to an embodiment may perform, for example, functions of a processor (for example, the processor 120 of FIG. 1) and/or an audio recording manager (for example, the audio recording manager 426 of FIG. 4).

According to an embodiment, the read task module 610 may be configured to generate a task command (read task (RT)) at predetermined time intervals, for example, every N ms according to a predetermined schedule and call the task.

According to an embodiment, the processor 120 may calculate a time stamp of each audio segment according to the number of calls of the RTs. For example, the time stamp may be a value (for example, timestamp=number of calls*N ms) obtained by multiplying the number of accumulated calls or call orders by a time interval (for example, N ms) between calls. Accordingly, the time stamp may be generated in accordance with the number of called RTs and the size of the audio segment regardless of the absolute time reference, for example, whether the audio segment exists or not.

Referring to FIG. 6, the RTs may be called and received at the time intervals (N ms) according to each task schedule in the order of calls such that a first RT (RT1) is at a first time point 601 according to the schedule and a second RT (RT2) is at a second time point 602 according to the schedule. The audio segment may be encoded according to the read task and the time stamp may be assigned to the encoded audio segment as described above.

Figure 7:
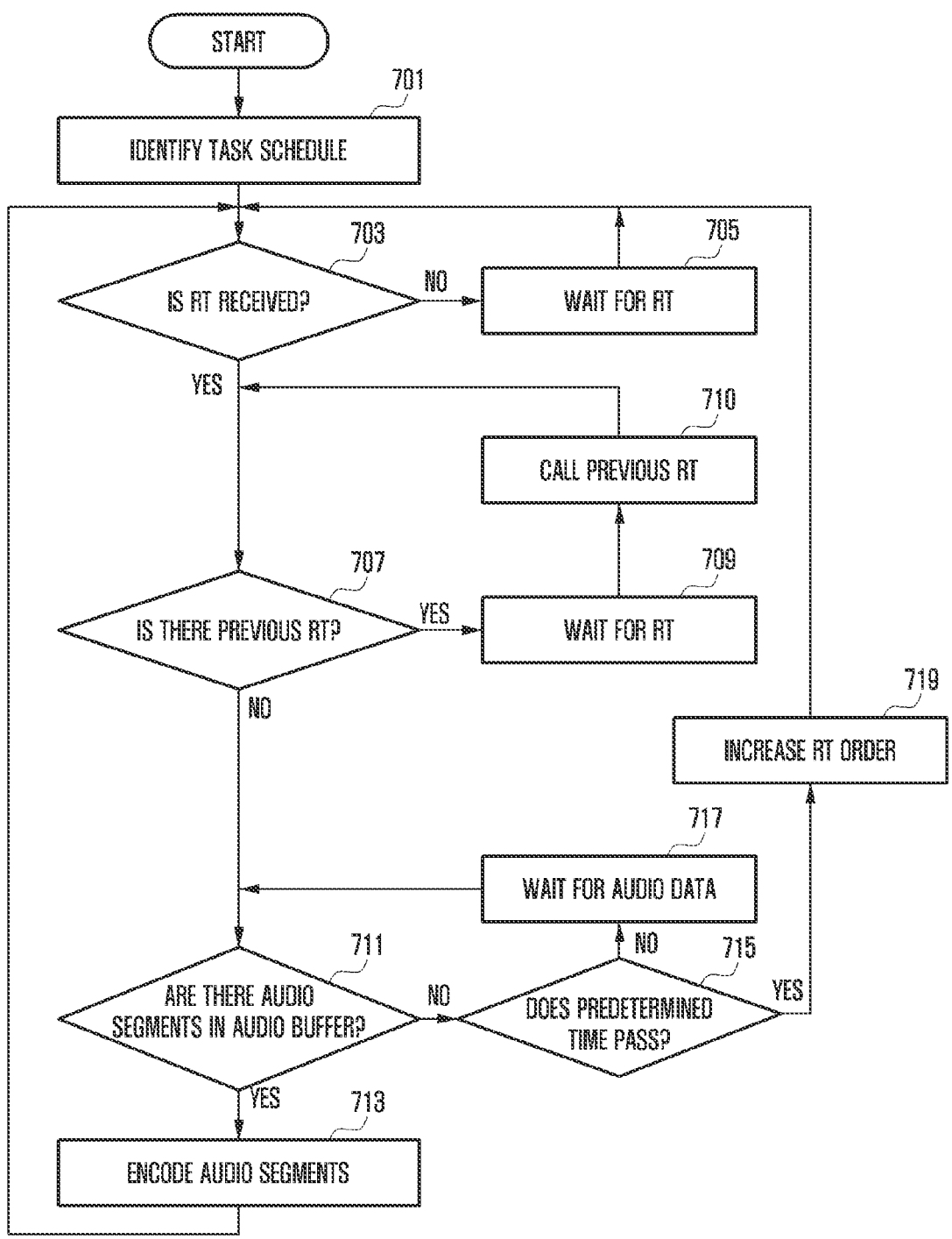
FIG. 7 is a flowchart illustrating an example operation of the electronic device according to various embodiments.

FIG. 7 is a flowchart illustrating an example operation of the electronic device according to various embodiments.

According to an embodiment, for example, a processor (for example, the processor 120 of FIG. 1) of the electronic device 101 may perform the screen recording function for content reproduced in the electronic device 101 on the basis of hierarchical architecture as implemented in FIG. 4 according to load and execution of a program (for example, the program 140 of FIG. 1 or FIG. 2).

According to an embodiment, an audio data stream received for encoding audio data according to the performance of the screen recording function for content may be divided into segments (hereinafter, referred to as audio segments) having a predetermined size and sequentially input into the audio buffer.

According to an embodiment, the audio buffer may be implemented to have a predetermined size (for example, the size enough to store 6 audio segments) in consideration of encoding efficiency and/or resource efficiency. The audio segments stored in the audio buffer may be output from the audio buffer in response to sequentially output task calls and then encoded. A task schedule (task scheduling) including the orders and intervals of the generation of task calls may be pre-designated and determined on the basis of various conditions for performing the screen recording function such as features of resources, content, and/or audio data of the electronic device 101.

According to an embodiment, the processor 120 of the electronic device 101 may identify a task schedule (task scheduling) according to the screen recording function in operation 701. For example, according to the task call schedule, task calls for encoding the audio segments input into the audio buffer may be periodically and sequentially generated and received (read) so that the received audio segments can be sequentially encoded according to a predetermined time period (for example, N ms) according to the screen recoding function.

According to an embodiment, the processor 120 of the electronic device 101 may identify whether RTs are received according to the task schedule based on the screen recording function in operation 703.

According to an embodiment, in spite of the task schedule according to the screen recording function, the RT for encoding the audio segments may not be generated and received at a predetermined time for any reason. For example, the RT cannot be received at a predetermined time in the screen recording function. For example, the RT may not be generated and received at a predetermined time due to delay of processing by other processes within the electronic device 101. For example, the RT may be pushed output another RT according to the schedule and thus may not be generated at a predetermined time.

According to an embodiment, when the RT is not received at a predetermined time according to the task schedule ('No' in operation 703), the processor 120 may attempt reception of the RT while waiting for the RT in operation 705. For example, RT calls may be attempted multiple times at predetermined time intervals while the RT is waited.

According to an embodiment, when the RT according to the schedule is received ('YES' in operation 703), the processor 120 may identify whether there is a previous RT of the received RT, that is, an RT having a higher priority in operation 707. For example, when the RT is received according to the schedule based on the predetermined time period, the RT received before the corresponding TR may be output and left without being performed.

According to an embodiment, when the RT according to the schedule is received but there is a previous RT ('YES' in operation 707), the processor 120 may wait for the received RT for a predetermined time in operation 709.

According to an embodiment, when a waiting time of the received RT passes according to operation 709, the processor 120 may identify whether the previous RT call is output, proceed to operation 707, and when the previous RT is output and there is no previous RT, proceed to operation 711 ('NO' in operation 707).

According to an embodiment, when the RT according to the schedule is received and there is no previous RT ('NO' in operation 707), the processor 120 may check the audio buffer to identify whether there is an audio segment in operation 711. For example, although the audio buffer is configured to temporarily store the sequentially input audio segments, the audio segments may not be received on time and thus there is no audio segment stored in the audio buffer in various situations since the audio data stream does not end.

According to an embodiment, when there is audio segment in the audio buffer ('NO' in operation 711), the processor 120 may proceed to operation 715 and identify whether a predetermined time passes and, when the predetermined time does not pass ('NO' in operation 715) wait for reception of audio data in operation 717. The predetermined time for which the audio data can be received may be configured, for example, such that the waiting can end before reception of the next task call according to the task schedule.

According to an embodiment, when the audio buffer is empty and the predetermined time passes although the reception of the audio segment is on standby for the predetermined time ('YES' in operation 715), the processor may proceed to operation 719 for the next RT to increase the RT order and return to operation 703. In this case, the predetermined time may be a time (for example, α) shorter than the RT call time period (for example, N ms).

According to an embodiment, the operation (operation 717) of waiting for reception of the audio segment for the predetermined time and the operation (operation 711) of checking the audio buffer according to the RT call may be repeated multiple times, and waiting times according to repetitions may be configured to the same as or different from each other.

According to an embodiment, even when the operation (operation 717) of waiting for reception of the audio segment for the predetermined time and the operation (operation 711) of checking the audio buffer according to the RT call are repeated multiple times, the accumulated waiting time may end before a time point at which the next RT call is scheduled according to the task schedule and operation 719 may be performed to increase the RT call order for the next RT call.

According to an embodiment, when there is the audio segments in the audio buffer ('YES' in operation 711), the processor 120 may proceed to operation 713, output the audio segments from the audio buffer, and encode the audio segments. Rather than a time stamp according to the lapse of time according to the task schedule, a time stamp corresponding to the number of accumulated received RT calls may be assigned to the audio segments which are output from the audio buffer and encoded according to the output of the received RT call. For example, the assigned time stamp may be recorded in a header of a packet generated according to the encoding the audio segments.

FIGS. 8A, 8B, 8C and 8D are diagrams illustrating an example of an operation of the electronic device according to various embodiments.

According to an embodiment, for example, a processor (for example, the processor 120 of FIG. 1) of the electronic device 101 may perform the screen recording function for content reproduced in the electronic device 101 on the basis of hierarchical architecture as implemented in FIG. 4 according to load and execution of a program (for example, the program 140 of FIG. 1 or FIG. 2).

A read task module 610 according to an embodiment may perform, for example, functions of a processor (for example, the processor 120 of FIG. 1) and/or an audio recording manager (for example, the audio recording manager 426 of FIG. 4).

According to an embodiment, the processor 120 may be configured to generate a task command (read task (RT)) at predetermined time intervals, for example, every N ms according to a predetermined schedule and call the task of reading and encoding the audio segments from the audio buffer.

Figure 8A:
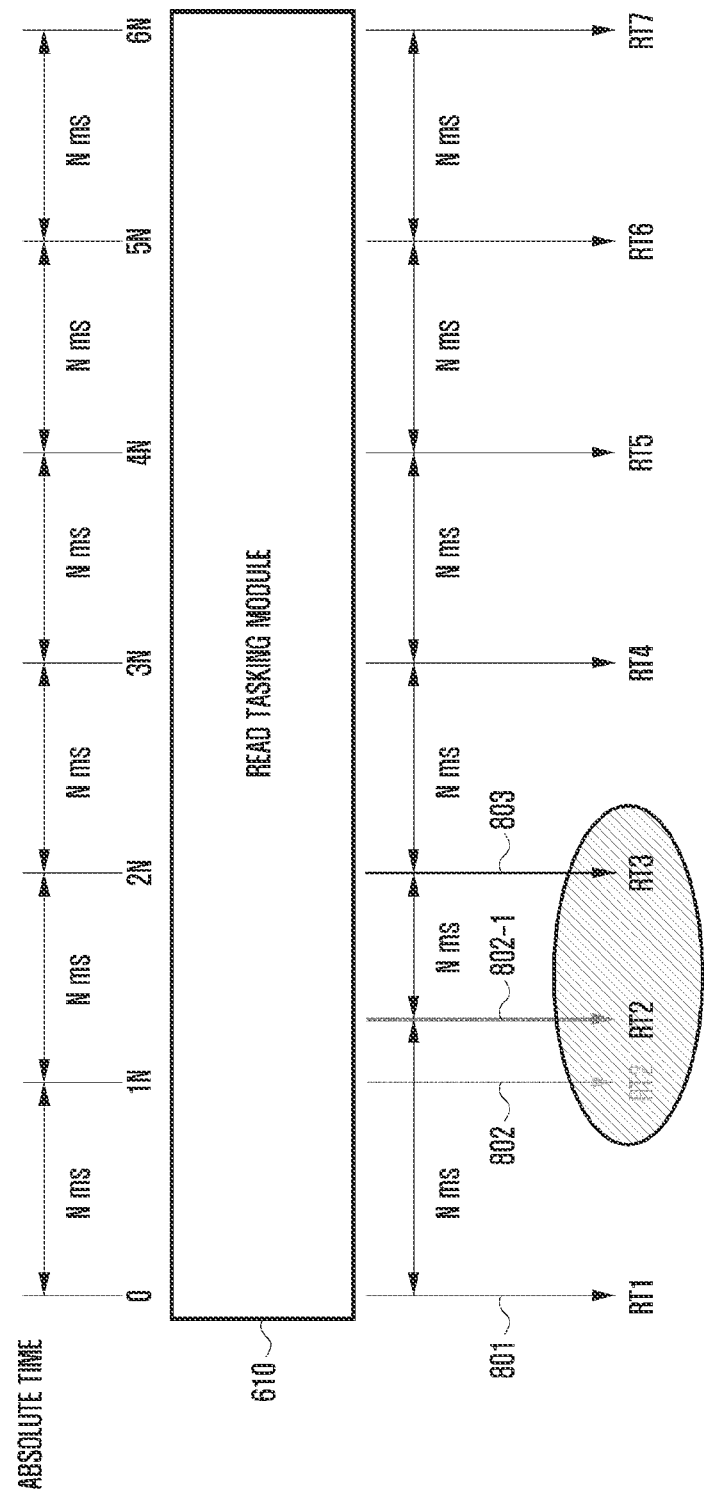
FIGS. 8A, 8B, 8C and 8D are diagrams illustrating an example operation of the electronic device according to various embodiments.

Referring to FIG. 8A, after the first RT (RT1) is received at a first time point 801 according to the schedule, the second RT (RT2) may not be received at a second time point (1N) 802.

According to an embodiment, as the second RT (RT2) is not received at the scheduled second time point (1N) 802, the processor 120 may wait for the second RT (RT2) for a predetermined time and call the second RT (RT2) at a controlled second time point 802-1 to receive the called task. Thereafter, according to reception of a third RT (RT3) at a third time point 803 based on the schedule, the order and time intervals (N ms) according to the task schedule may be normalized and thus the tasks may be periodically called and received.

According to an embodiment, when RTs are delayed, the processor 120 may receive at least some of the RTs thereafter according to an earlier period by controlling the predetermined period. For example, when the second RT (RT2) is delayed by a from the scheduled time and thus is received at a controlled second time point (N+α) after the first RT (RT1) is called, the processor 120 may receive the third RT (RT3) after a controlled time interval (N−α) from the second time point (N+α) so that the third RT (RT3) can be received at the scheduled time (2N).

According to an embodiment, even though some RTs are delayed, the processor 120 may sequentially receive the tasks by controlling the time points at which the delayed tasks are received that are different from the schedule, thereby sequentially encoding audio segments corresponding thereto. Therefore, the read task call orders are maintained and thus the number of accumulated task calls can be maintained, and the time stamp may be assigned according to the absolute time reference on the basis thereof.

Figure 8B:
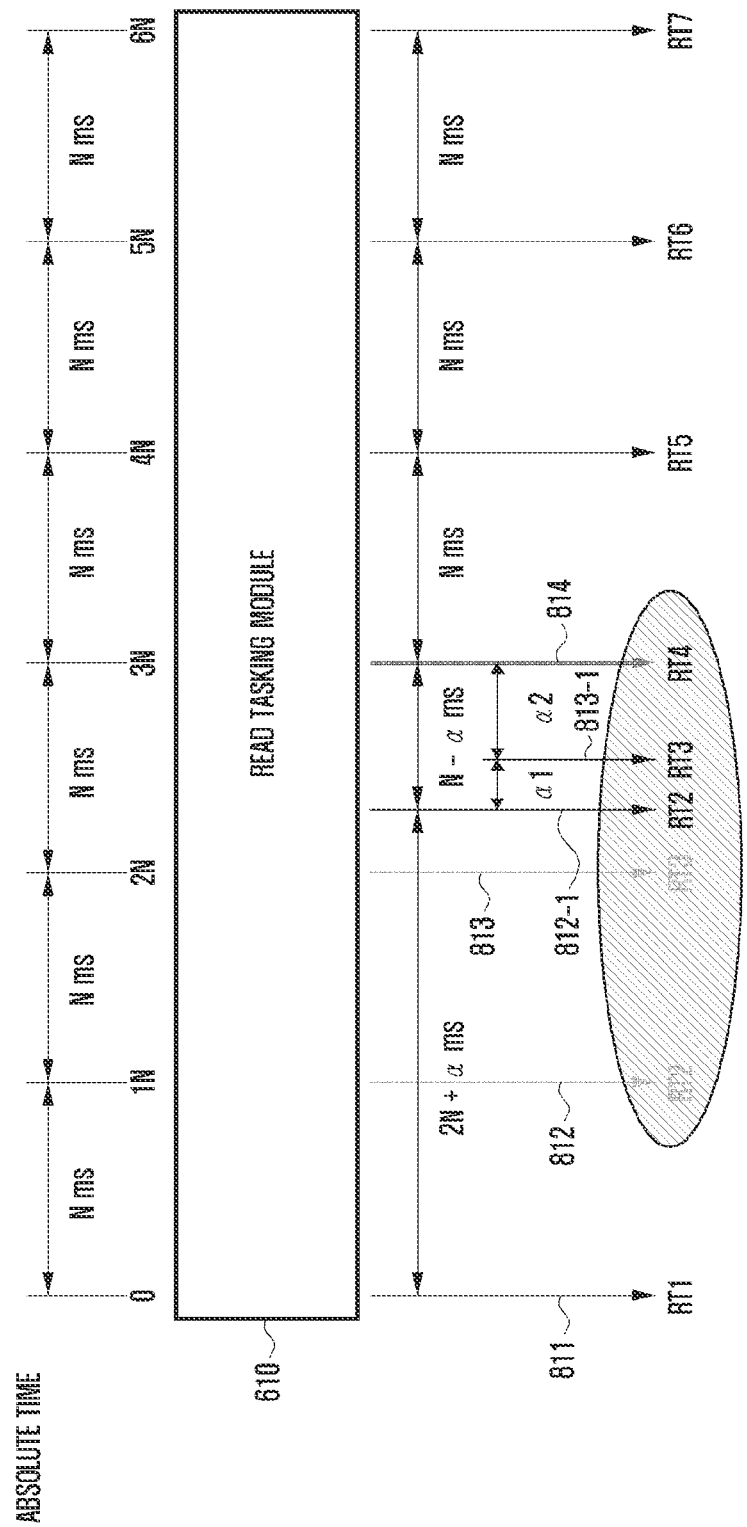

Referring to FIG. 8B, after the first RT (RT1) is received at the first time point 811 according to the schedule, the second RT (RT2) may not be received at the scheduled time point (RT2) 812 and the third RT (RT3) may be received at the scheduled time point (RT3) 813.

According to an embodiment, the processor 120 waits for the second RT (RT2) for a predetermined time as the second RT (RT2) has not been received at the scheduled time point. Nevertheless, as the third RT (RT3) is also not received at the predetermined time point, the processor 120 may wait for both the second RT (RT2) and the third RT (RT3).

According to an embodiment, the processor 120 may wait for the second RT (RT2) before the third RT (RT3) after the first RT (RT1), and when the second RT (RT2) is called and received at a second time point 812-1 (after 2N+α ms from the first time point 811), control a time point 813-1 at which the third RT (RT3) is called to be, for example, a time point within a1 after the second time point 812-1 so that the third RT (RT3) can be received before a scheduled time point 814 of a fourth RT (RT4) after the second time point 812-1.

Accordingly, the third RT (RT3) and the fourth RT (RT4) can be called within N−α shorter than the conventional scheduled RT reception intervals (N ms) after the second time 812-1 at which the second RT (RT2) is received.

According to an embodiment, when RTs are delayed, the processor 120 may receive at least some of the RTs thereafter at an earlier period by controlling the predetermined period. For example, after the first RT (RT1) is called, the processor 120 may receive the second RT (RT2) at a controlled second time point ((2N+α) delayed by N+α from the time point at which the second RT (RT2) is scheduled. Further, when the third RT (RT3) is also not received at the scheduled time (2N) as well as the second RT (RT2), the processor 120 may receive the third RT at a third time point (2N+α+α) controlled to be a shorter time interval (α1) after the controlled second time point (2N+α) of the second RT (RT2). In addition, the processor may call the fourth RT (RT4) to receive the same at a fourth time point (3N) controlled to be a shorter time interval ((N−α−α1) or α2) from the third time point (N+α) so that the fourth RT (RT4) can be received at the scheduled time (3N).

According to an embodiment, even though some RTs are delayed, the processor 120 may sequentially receive the tasks by controlling the time points at which the delayed tasks are received that are different from the schedule, thereby sequentially encoding audio segments corresponding thereto. Therefore, the read task call orders are maintained and thus the number of accumulated task calls can be maintained, and the time stamp may be assigned according to the absolute time reference on the basis thereof.

Figure 8C:
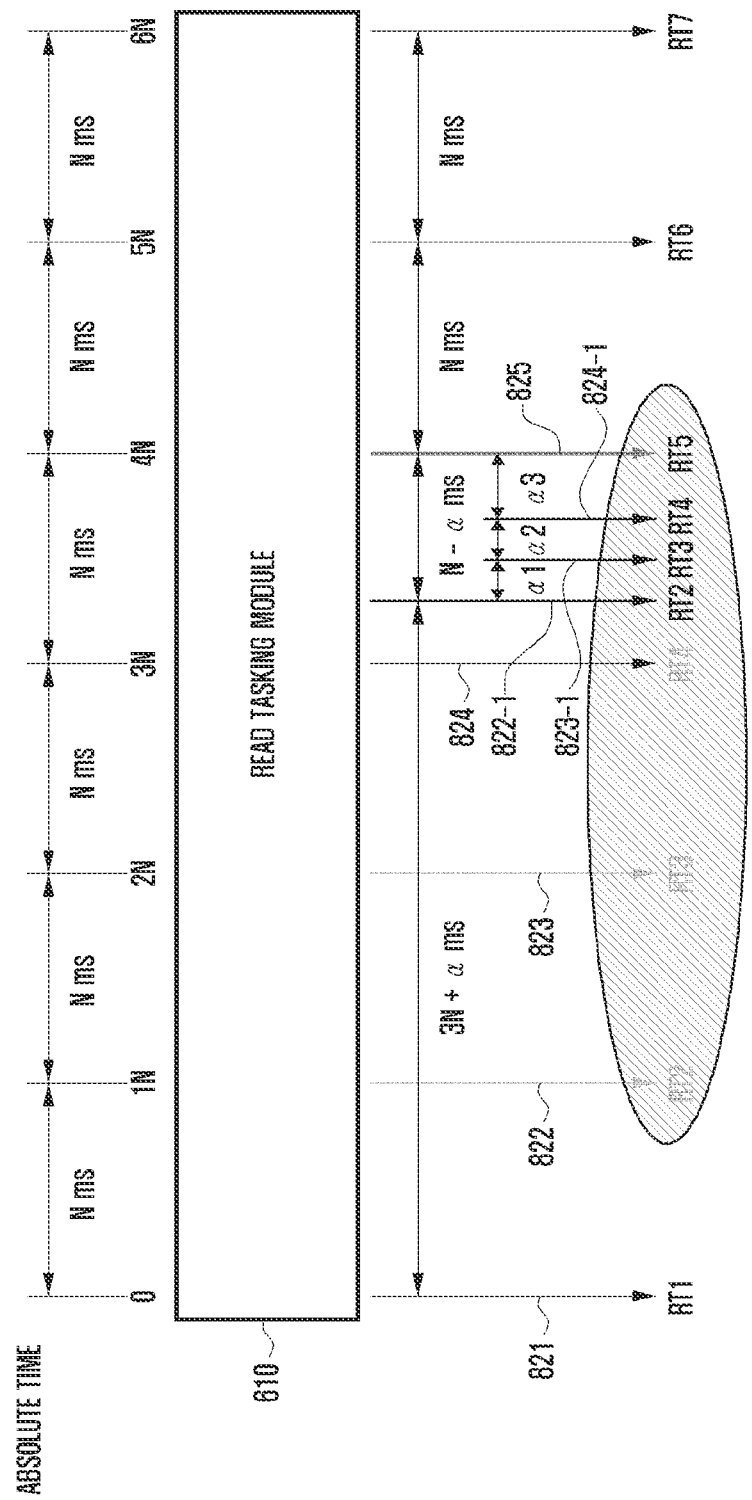

Referring to FIG. 8C, after the first RT (RT1) is received at the first time point 821 according to the schedule, the second RT (RT2) may not be called at the scheduled time point 822, the third RT (RT3) may not be called at the scheduled time 823, and the fourth RT (RT4) may not be called at the scheduled time point 824.

According to an embodiment, as the second RT (RT2) is not received at the scheduled time point 822, the processor 120 may wait for the second RT (RT2) for a predetermined time. Nevertheless, the third RT (RT3) and the fourth RT (RT4) are also not received at the predetermined time points, and thus all of the second RT (RT2), the third RT (RT3), and the fourth RT (RT4) may be delayed.

According to an embodiment, the processor 120 may wait for the second RT (RT2) before the third RT (RT3) after the time point 821 at which the first RT (RT1) is received, and when the second RT (RT2) is called and received at a second time point 822-1 (after 3N+α ms from the first time point 821), control a time point 823-1 at which the third RT (RT3) is called and a time point 824-1 at which the fourth RT (RT4) is called so that the third RT (RT3) and the fourth RT (RT4) can be called before a fifth time point 825 of a fifth RT (RT5) scheduled after the controlled second time point 822-1. For example, the time point 823-1 at which the third RT (RT3) is called may be controlled to be a time point after α1 from the second time point 822-1, and the time point 824-1 at which the fourth RT (RT4) is called may be controlled to be a time point after α2 from the third time point 823-1. Accordingly, after the second time point 8221-1 of the second RT (RT2), the third RT (RT3) can be called at the third time point 823-1 within N−α shorter than the conventionally scheduled RT interval (N ms), the fourth RT (RT4) can be called at the fourth time point 824-1, and then the fifth RT (RT5) can be called at an originally scheduled time point 825 after a time interval α3 shorter than the scheduled time interval (N ms) from the time point 824-1 at which the fourth RT (RT4) is called.

According to an embodiment, when the RTs are delayed, the processor 120 may control scheduled time points and scheduled periods of at least some of the RTs so that the RTs can be received according to earlier periods.

Figure 8D:
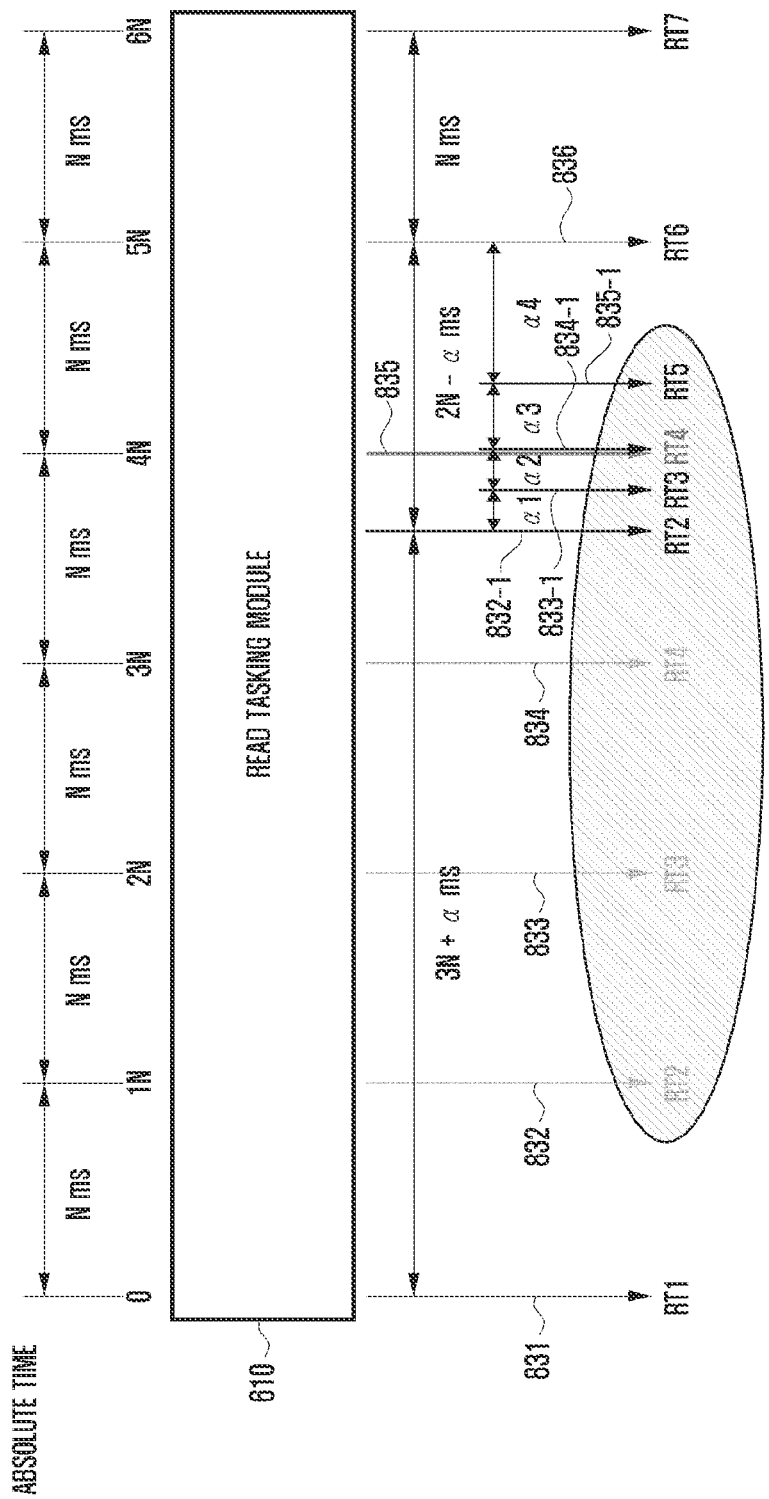

Referring to FIG. 8D, after the first RT (RT1) is received at the first time point 831 according to the schedule, the second RT (RT2) may not be called at the scheduled time point 832, the third RT (RT3) may not be called at the scheduled time point 833, and the fourth RT (RT4) may not be called at the scheduled time point 834.

According to an embodiment, as the second RT (RT2) is not received at the scheduled time point, the processor 120 may wait for the second RT (RT2) for a predetermined time. Nevertheless, as the third RT (RT3) and the fourth RT (RT4) are also not received at the predetermined points, all of the second RT (RT2), the third RT (RT3), and the fourth RT (RT2) may be delayed and on standby.

According to an embodiment, when the second RT (RT2) is called and received at a controlled second time 832-1 (after 3N+α ms from the first time point 831) after the first RT time point 831, the processor 120 may call the third RT (RT3) at a third time point 833-1 that is a time point after a minimum task call time period, for example, α1 from the controlled second time point 832-1.

Thereafter, it is possible to control the fourth RT (RT4) to be called at a fourth time point 834-1 that is a time point after a minimum task call time period, for example, α2 by controlling the time point at which the fourth RT (RT4) is called.

According to an embodiment, the time point (4N) at which the fifth RT (RT5) is received arrives according to the schedule and thus the fifth RT (RT5) can be called before the controlled time point 834-1 at which the fourth RT (RT4) is called. In this case, the processor 120 may identify whether the RT before the fifth RT (RT5), that is, a higher priority RT is on standby. The processor 120 may identify that the fifth RT (RT5) has been received but the fourth RT (RT4) which is the previous RT is on standby, and delay the time point at which the fifth RT (RT5) is called and makes the fifth RT (RT5) on standby.

According to an embodiment, the processor 120 may control the time point at which the fifth RT (RT5) on standby is called to be a time point 835-1 after α3 from the time point 834-1 at which the fourth RT (RT2) is called, and then a time point 836 at which a sixth RT (RT6) is called to be a time point after α4 from the fifth time point 835-1. Accordingly, the sixth RT (RT6) can be called at an originally scheduled time point (5N) 836 after α4 shorter than the conventional scheduled RT interval (N ms) from the fifth time point 835-1 of the fifth RT (RT5).

According to an embodiment, when the RTs are delayed, the processor 120 may control scheduled time points and scheduled periods of at least some of the RTs so that the RTs can be received according to earlier periods.

Figure 9A:
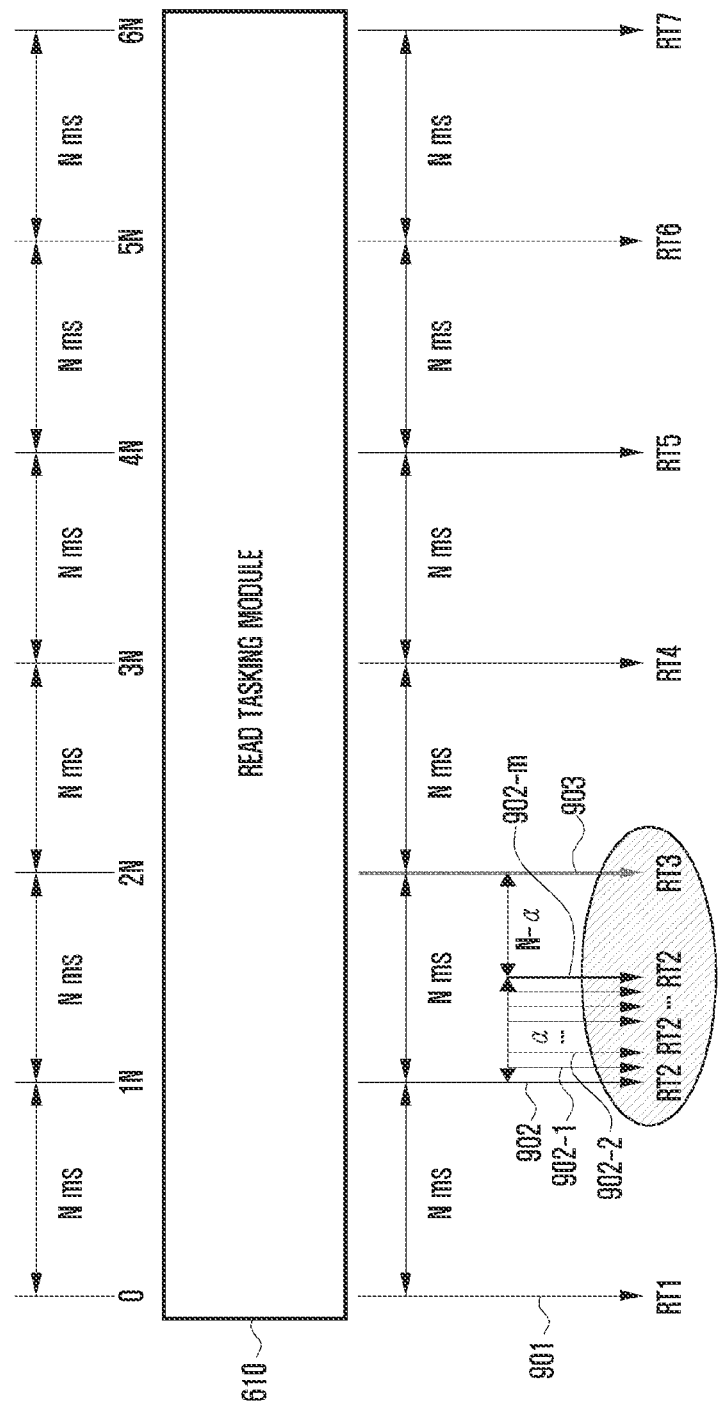
FIGS. 9A and FIG. 9B are diagrams illustrating an example operation of the electronic device according to various embodiments.
Figure 9B:
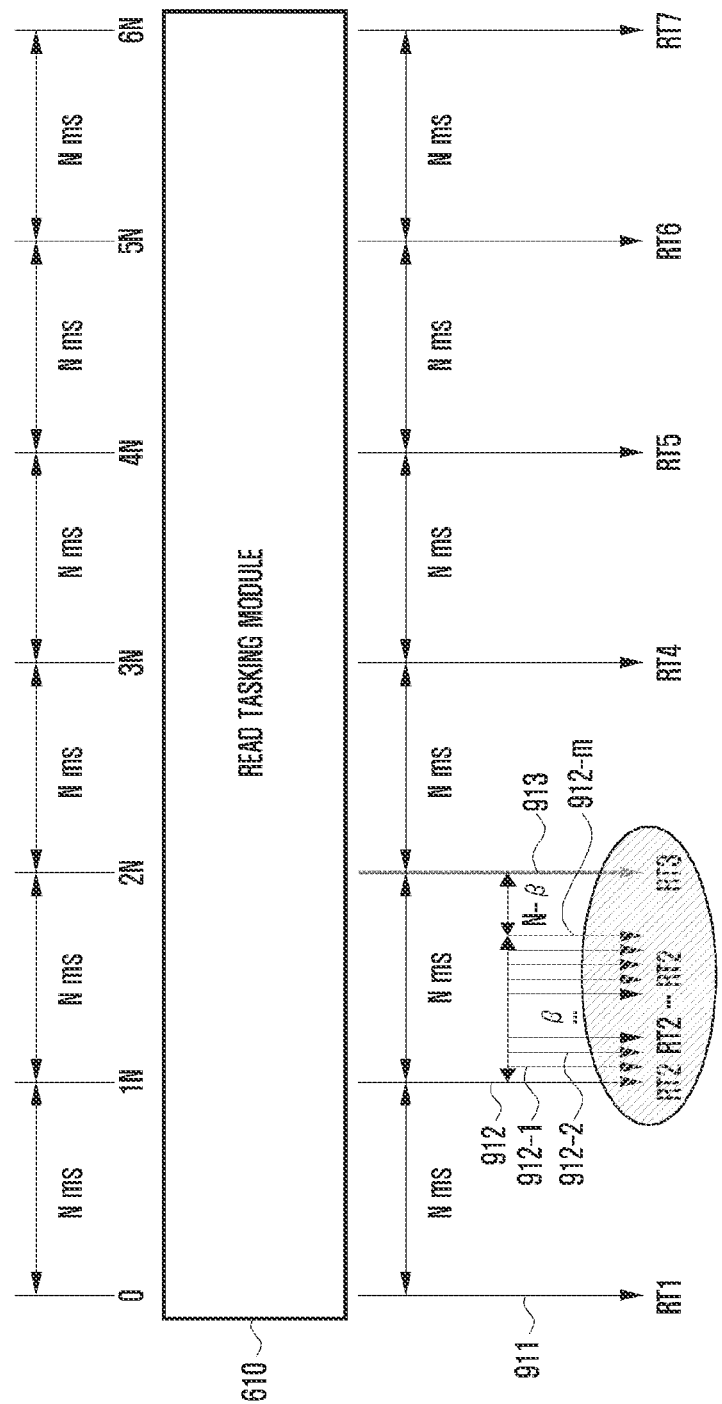

FIGS. 9A and 9B are diagrams illustrating an example of an operation of an electronic device (for example, the electronic device 101 of FIG. 1) according to various embodiments.

According to an embodiment, for example, a processor (for example, the processor 120 of FIG. 1) of the electronic device 101 may perform the screen recording function for content reproduced in the electronic device 101 on the basis of hierarchical architecture as implemented in FIG. 4 according to load and execution of a program (for example, the program 140 of FIG. 1 or FIG. 2).

A read task module 610 according to an embodiment may perform, for example, functions of a processor (for example, the processor 120 of FIG. 1) and/or an audio recording manager (for example, the audio recording manager 426 of FIG. 4).

According to an embodiment, the processor 120 may be configured to generate a task command (read task (RT)) at predetermined time intervals, for example, every N ms according to a predetermined schedule and call the task of reading and encoding the audio segments from the audio buffer.

Referring to FIG. 9A, even though the second RT (RT2) is received at the scheduled time point (N) after the first RT (RT1) is received at a first time point 901 according to the schedule and the task is performed, there is no audio segment in the audio buffer. For example, audio information may be lost due to lack of resources of hardware and/or software, an error in data input/output, and/or execution of a plurality of programs such as applications executed in the background.

According to an embodiment, when the second RT (RT2) is received but the audio buffer is empty, the processor 120 may attempt a task call according to the second RT (RT2) before a time point at which the next task (third RT (RT3)) is received.

According to an embodiment, when the second RT (RT2) is received at the scheduled second time point (1N) but the audio buffer is empty, the processor 120 may repeatedly perform calls according to the second RT (RT2) by a predetermined number (m) of times for a predetermined time (α), so as to attempt the output of the audio segments from the audio buffer at least once 902-1, 902-2, ..., 902-m.

According to an embodiment, the processor 120 may perform the output task call for the audio buffer according to the second RT (RT2) before the scheduled time point (2N) of the third RT (RT3).

According to an embodiment, when audio segments are input into the audio buffer before the time point 903 at which the third RT (RT3) is received, the processor 120 may perform the output task for the audio buffer according to the second RT (RT2) and encode the audio segments.

Accordingly, as the task according to the second RT (RT2) scheduled at the second time point 902 is performed at the controlled time point and then the audio segments according to the third RT (RT3) scheduled at the third time point 903 are encoded, the RTs may be sequentially performed, and an absolute time reference time stamp according to the number of accumulated calls of the RTs may be assigned to the encoded audio segments in response to the RTs.

According to an embodiment, even when no TR is delayed, if there is no audio segment according to a state of the audio buffer, it is possible to control the RT time point, re-identify the audio buffer at the controlled time point, and attempt encoding of the late input audio segments, so as to reduce loss of audio data.

Referring to FIG. 9B, even though the second RT (RT2) is received at the scheduled time point (1N) after the first RT (RT1) is received at the first time point 911 according to the schedule and the task is performed, there is no audio segment in the audio buffer.

According to an embodiment, when the second RT (RT2) is received but the audio buffer is empty, the processor 120 may attempt a task call according to the second RT (RT2) before a time point at which the next task (third RT (RT3)) is received.

According to an embodiment, when the second RT (RT2) is received at the scheduled second time point (1N) but the audio buffer is empty, the processor 120 may repeatedly perform calls according to the second RT (RT2) by a predetermined number (m) of times for a predetermined time (β), so as to attempt the output of the audio segments from the audio buffer at least once 912-1, 912-2, ..., 912-m.

According to an embodiment, the processor 120 may perform the output task call on the audio buffer according to the second RT (RT2) before the scheduled time point of the third RT (RT3).

According to an embodiment, when there is no input of the audio segment into the audio buffer before the time point 913 at which the third RT (RT3) is received, the processor 120 may not perform the output task for the audio buffer according to the second RT (RT2). In this case, the processor 120 may increase the number of RTs or the task call order by 1 and call the third RT (RT3). Accordingly, even when the task according to the second RT (RT2) scheduled at the second time point 912 is not performed and thus there is no encoded audio segment, the time stamp for encoding of the audio segments according to the third RT (RT3) scheduled at the third time point 913 may be configured as 2N according to the task order and the time interval (N ms) according to the absolute time reference, for example, the number of accumulated calls.

According to an embodiment, when no audio segment is input even though the RT time point is controlled according to delay of the audio input and the audio buffer is re-identified at the controlled time point, it is possible to increasing the number of calls of RTs in time stamps for audio encoding according to the next RT to assign the time stamps according to the absolute time reference, so as to prevent/reduce audio skip by performing the next RT at the scheduled time point and also accumulating the number of calls of RTs, for which audio encoding has not been performed.

According to an embodiment, although audio encoding for some RTs is not performed, it is possible to increasing and accumulating the number of calls after non-performed tasks unlike the schedule and assign time stamps to encoded audio segments according to the number of accumulated calls, thereby preventing and/or reducing audio skip.

Figure 10:
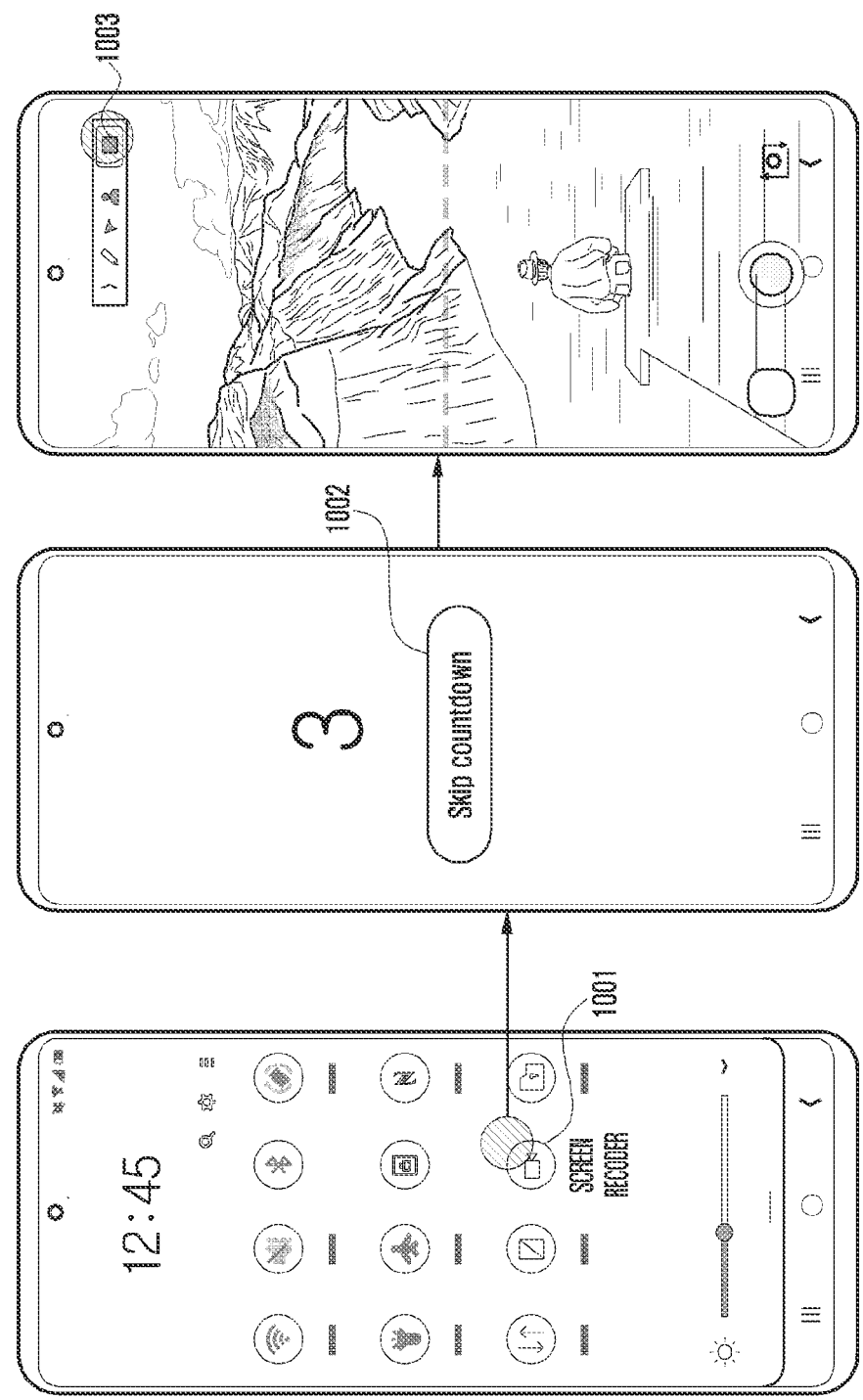
FIGS. 10 and 11 are diagrams illustrating examples of a user interface according to an operation of the electronic device according to various embodiments.
Figure 11:
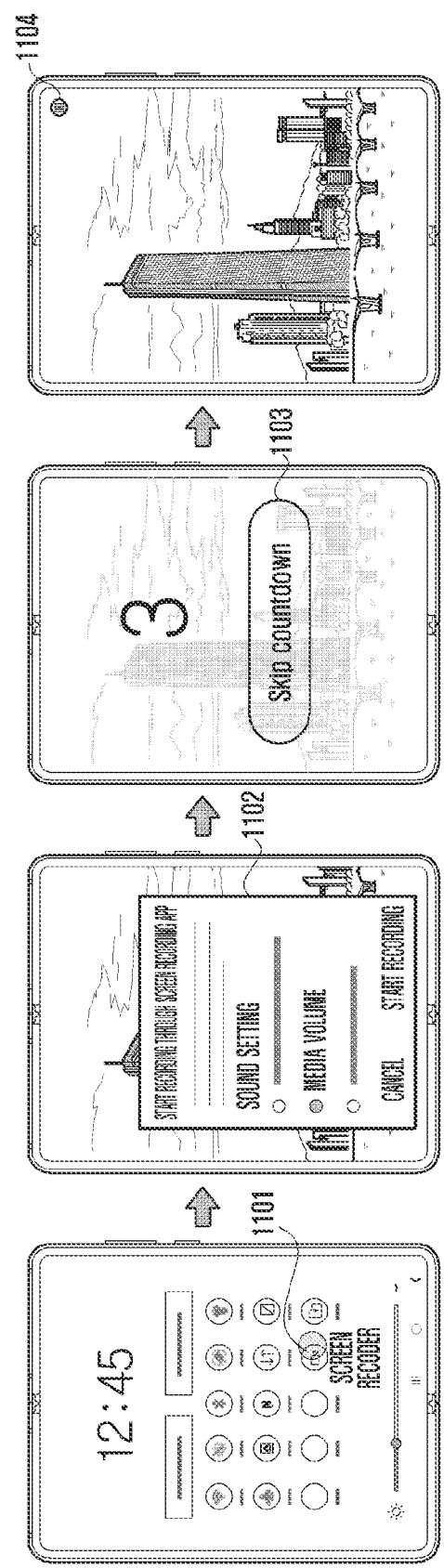

FIGS. 10 and 11 are diagrams illustrating examples of a user interface displayed on a display (for example, the display module 160 of FIG. 1) according to an operation of an electronic device (for example, the electronic device 101 of FIG. 1) according to various embodiments.

Referring to FIG. 10, a processor (for example, the processor 120 of FIG. 1) of the electronic device 101 may perform an operation of displaying the user interface on the display 160 according to execution of an application.

The electronic device 101 may provide, as the user interface, various menu screens for performing a screen recording function according to various embodiments, for example, a screen recorder function execution menu 1001 to a quick panel.

According to an embodiment, content reproduced in the electronic device 101 may be recorded according to selection of the screen recording function menu. For example, the screen recording function may be performed according to selection of the screen recorder function execution menu 1001. For example, when the screen recording function is performed, the electronic device may stand by while a program for performing the corresponding function is loaded or the screen recording function for content being currently reproduced through the electronic device 101 may start according to selection of a skip countdown menu 1002.

According to an embodiment, various edit menus including a menu button 1003 for stopping the screen recording function may be provided to the display 160 while the content reproduced in the electronic device is recorded according to the screen recording function.

Referring to FIG. 11, the processor 120 of the electronic device 101 may perform an operation of displaying the user interface on the display 160 according to execution of an application.

The electronic device 101 may provide, as the user interface, various menu screens for performing a screen recording function according to various embodiments, for example, a screen recorder function execution menu 1101 to a quick panel.

According to an embodiment, the electronic device 101 may provide a detailed setting menu 1102 according to the screen recording function. For example, the detailed setting menu 1102 may pop up to be displayed by a long touch on the function execution menu 1101. For example, the detailed setting menu 1102 may provide a menu for configuring various sound sources recorded according to the screen recording function and/or configuring the sound volume.

According to an embodiment, content reproduced in the electronic device 101 may be recorded according to selection of the screen recording function menu. For example, the screen recording function may be performed according to selection of the screen recorder function execution menu 1101. For example, when the screen recording function is performed, the electronic device may stand by while a program for performing the corresponding function is loaded or the screen recording function for content being currently reproduced through the electronic device 101 may start according to selection of a skip countdown menu 1103.

According to an embodiment, a menu button 1104 for stopping the screen recording function may be provided to the display 160 while the content reproduced in the electronic device 101 is recorded according to the screen recording function.

Figure 12:
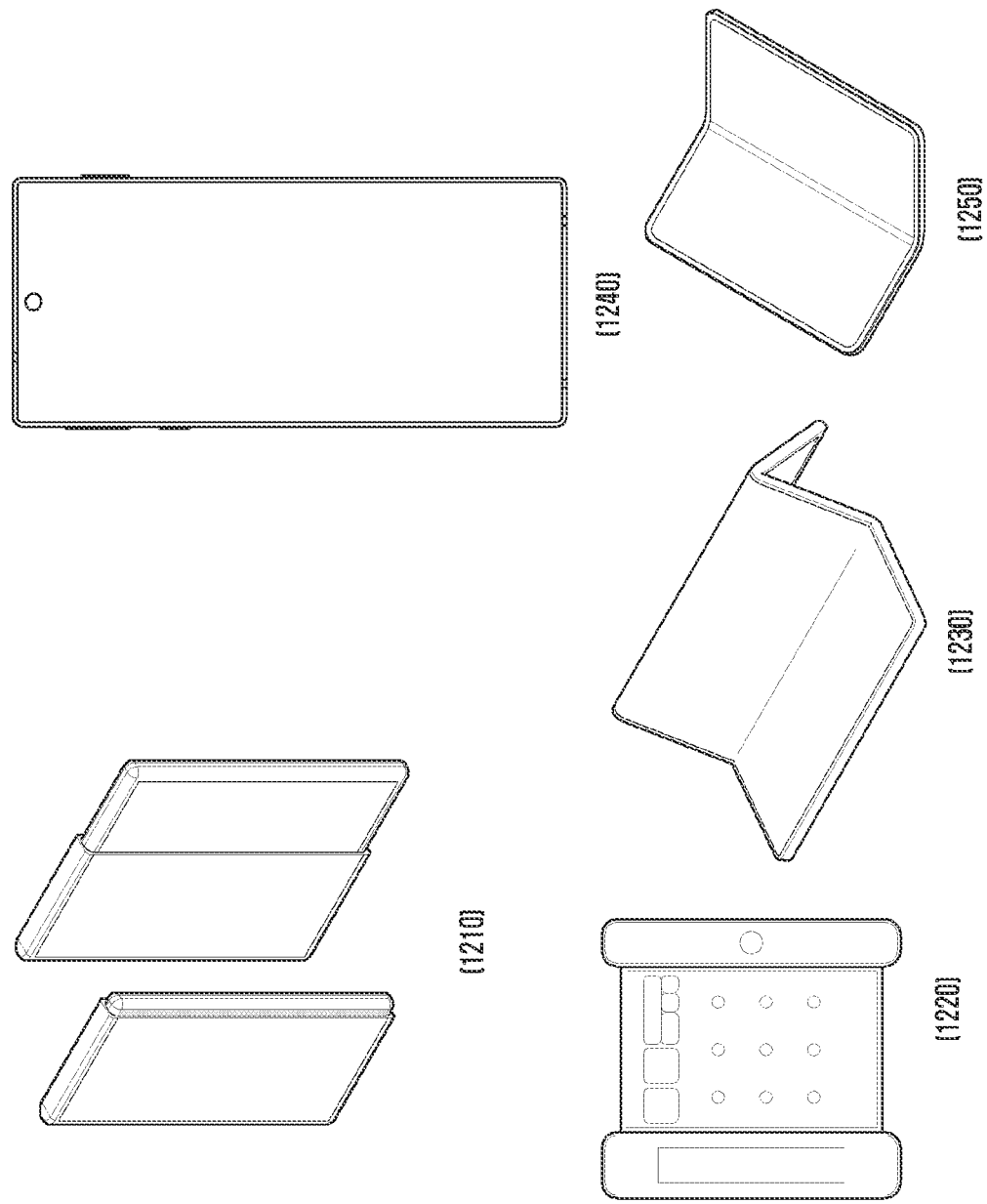
FIG. 12 is a diagram illustrating examples of electronic devices of various form factors according to various embodiments.

FIG. 12 includes diagrams illustrating various examples of an electronic device (for example, the electronic device 101 of FIG. 1) of various form factors to which various embodiments are applied.

Referring to FIG. 12, the electronic device (for example, the electronic device 101 of FIG. 1) according to various embodiments may be implemented as form factors in various types. For example, the electronic device 101 may include at least one of a slidable electronic device 1210, a rollable electronic device 1220, a first foldable electronic device 1230, a bar-type electronic device 1240, and a second foldable electronic device 1250. The first foldable electronic device 1230 may include at least two hinge structures (not shown), and the second foldable electronic device 1250 may include one hinge structure (not shown). The first foldable electronic device 1230 or the second foldable electronic device 1250 may include a foldable (or bent) display (for example, a flexible display) and may be folded or unfolded to be used on the basis of the hinge structures.

The electronic device 101 according to various embodiments of the disclosure may be implemented as electronic devices 1210, 1220, 1230, 1240, and/or 1250 of various form factors as described above, and various embodiments can be applied to the screen recording function of a plurality of pieces of content reproduced through one or more displays of the electronic devices including two or more displays. For example, the screen recording function according to various embodiments may be applied to a screen recording function for content reproduced through each of a plurality of displays and/or each of screen recording functions for a plurality of pieces of content reproduced through multi screens of one display.

The form factors of the electronic device 101 and/or the screen recording function for content reproduced in at least one of the plurality of displays are not limited thereto.

Figure 13:
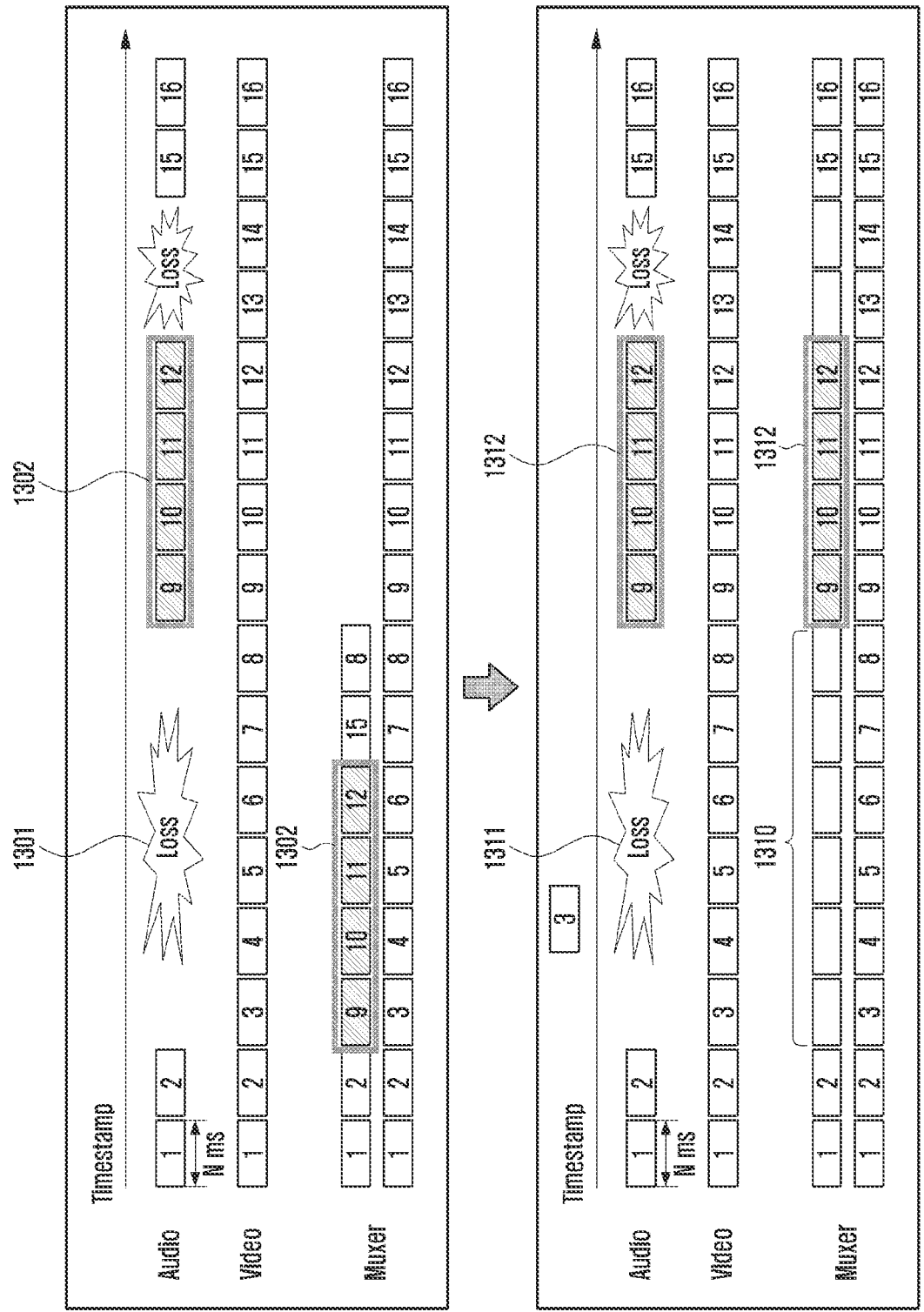
FIG. 13 is a diagram illustrating an example in which the operation of the electronic device is applied according to various embodiments.

FIG. 13 is a diagram illustrating an example in which the operation of the electronic device is applied according to various embodiments.

In FIG. 13, the upper figure illustrates a comparative embodiment in which an example, when loss 1301 of one or more audio segments is generated, audio segments 1302 input thereafter are encoded according to a schedule is illustrated. In this case, when recorded content is reproduced, the audio segments 1302 are multiplexed (mux) with video encoding data according to a time stamp based on the audio encoding order, and thus audio and video data may not be synchronized.

According to various embodiments, the lower figure illustrates an example of various embodiments of, even though loss 1311 of one or more audio segments is generated, encoding audio segments 1312 input thereafter according to a controlled task schedule and generating and recording a time stamp according to a controlled absolute time reference. In this case, the number of tasks for the lost audio segments 1310 may be accumulated according to the time stamp based on the controlled absolute time reference of the audio segments at a time point at which multiplexing (mux) with the video encoding data is performed. When recorded content is reproduced, the encoded audio segments 1312 may be multiplexed with the video encoding data according to the absolute time reference, and thus audio and video data may be synchronized.

Figure 14A:
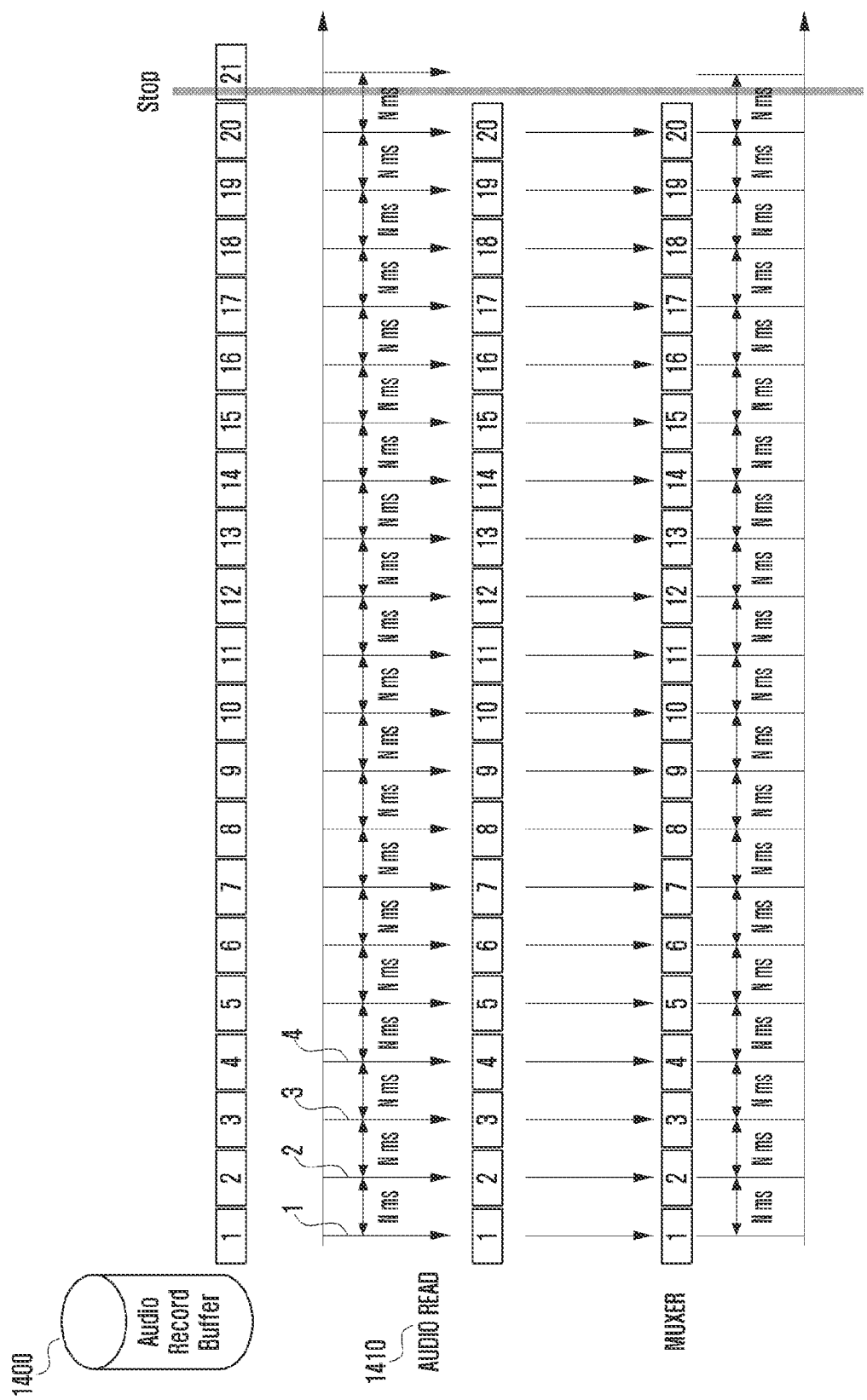
FIGS. 14A, 14B and 14C are diagrams illustrating an example in which an operation of the electronic device is applied according to various embodiments.
Figure 14B:
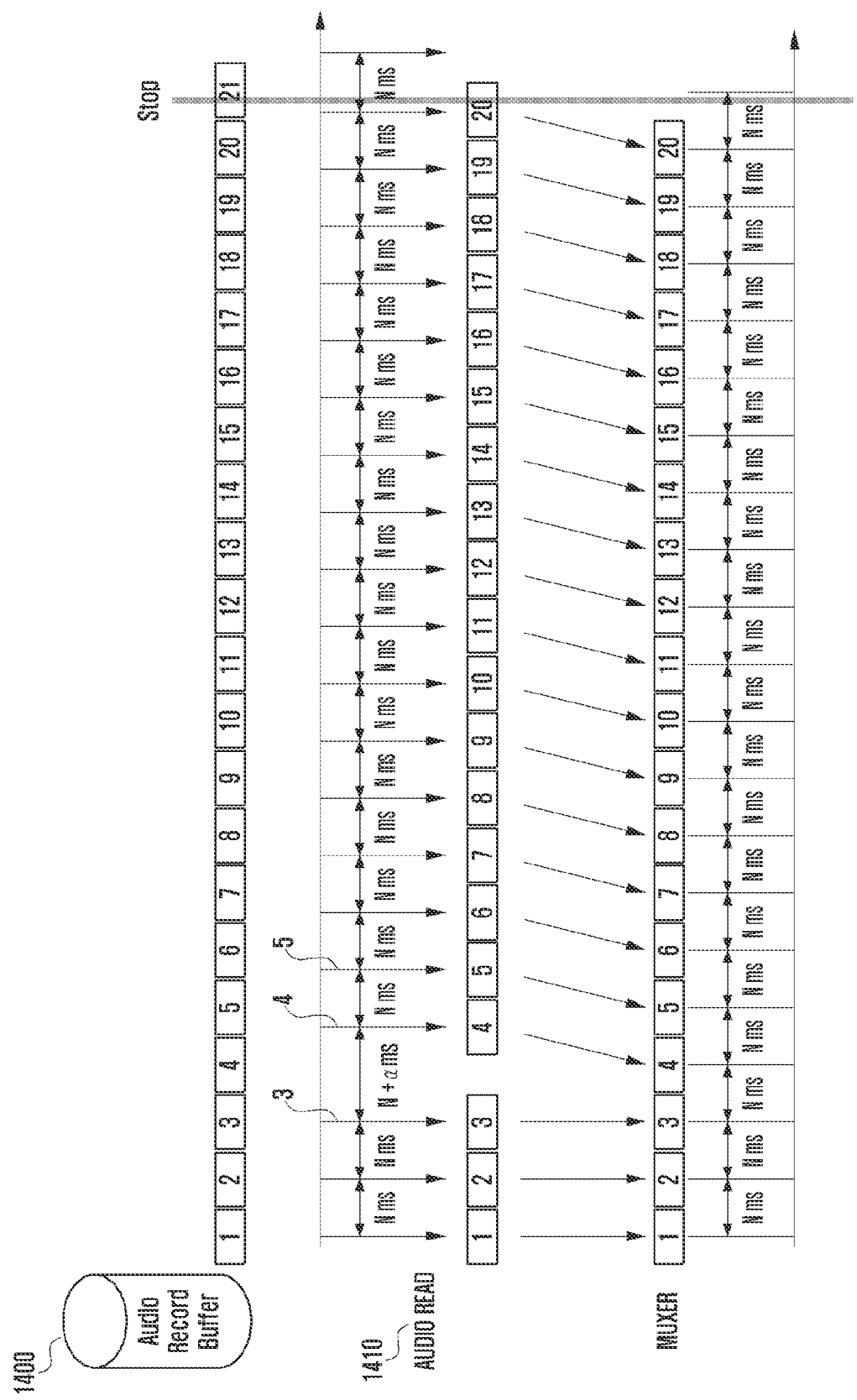
Figure 14C:
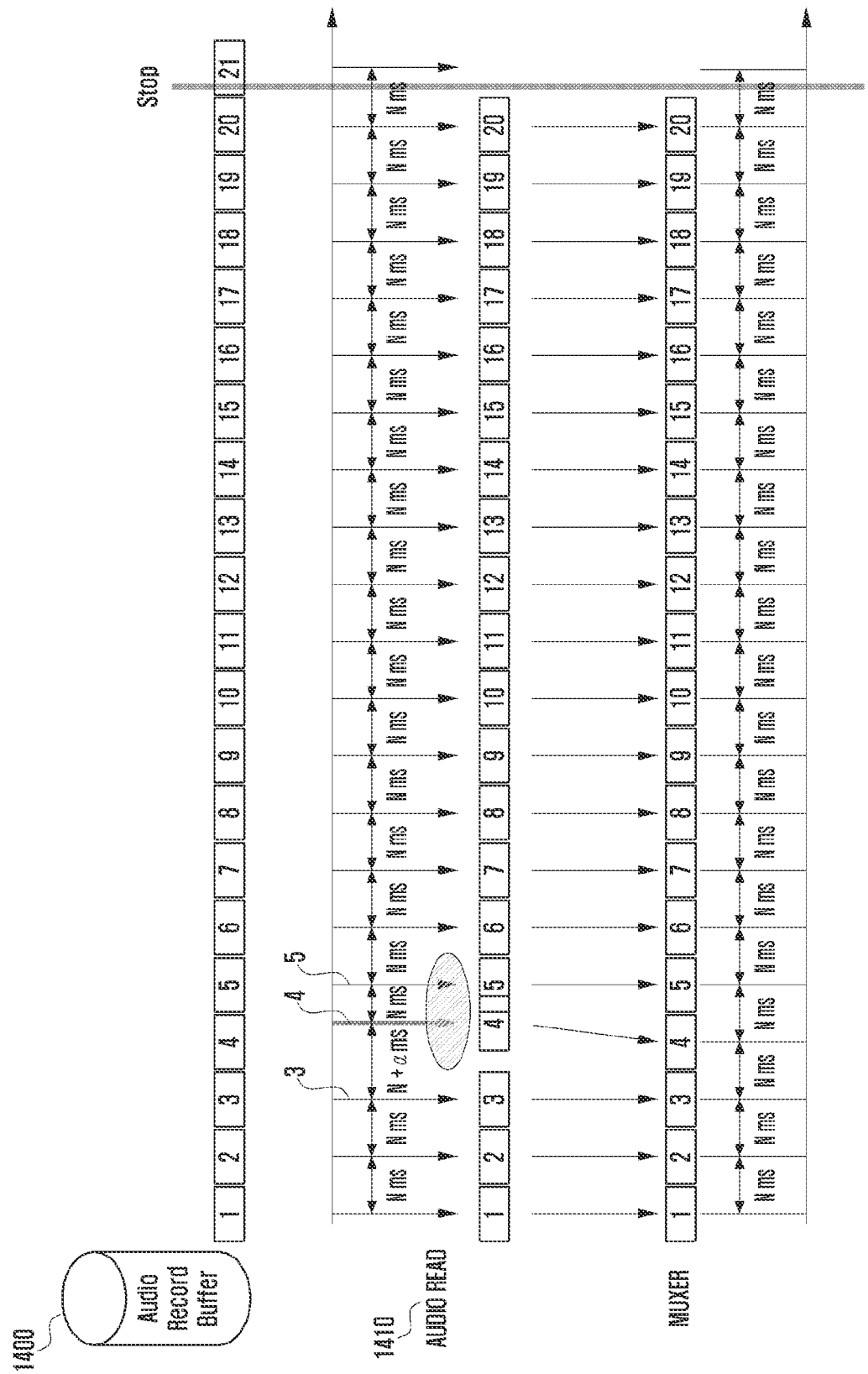
Figure 15A:
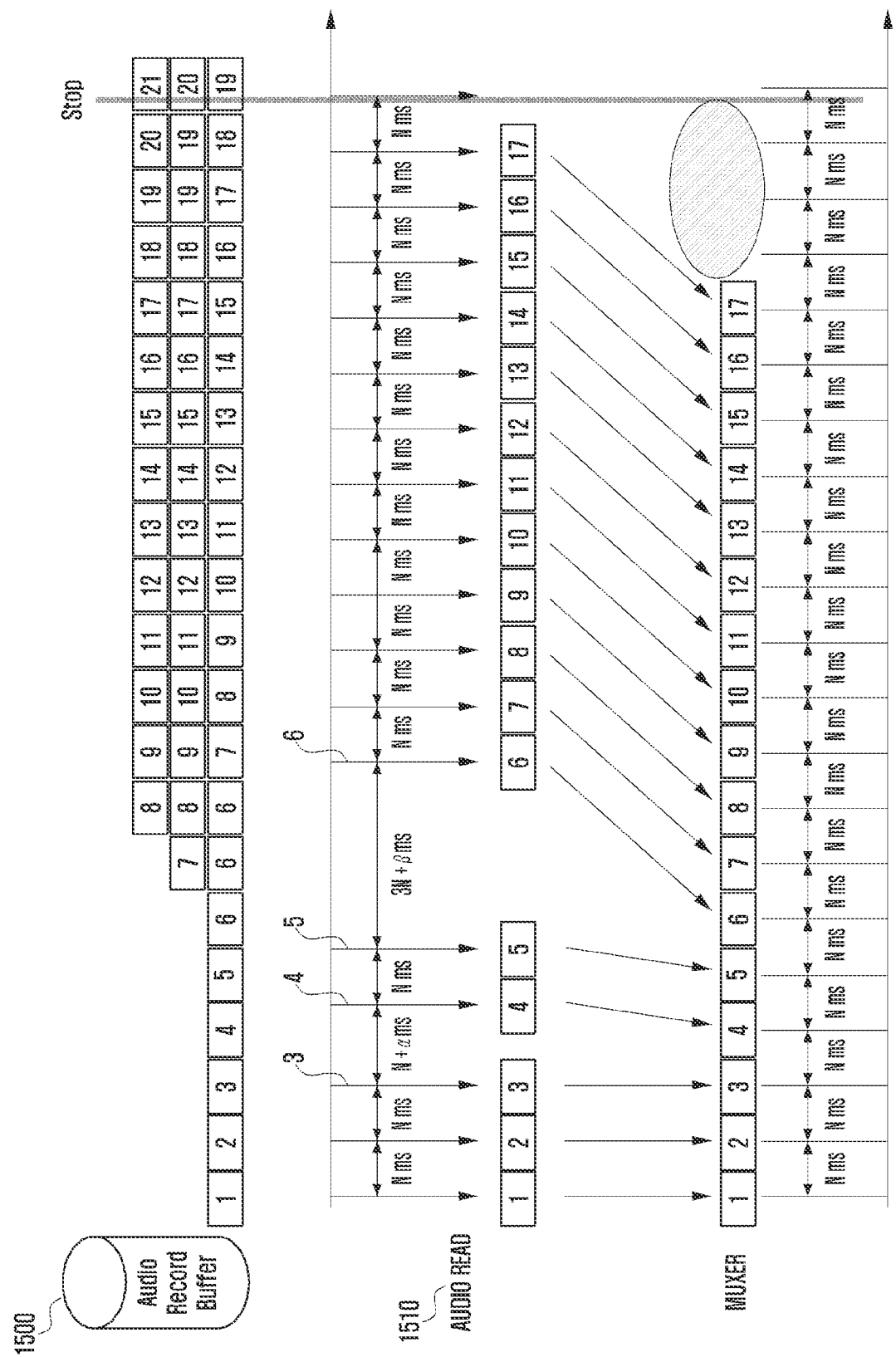
FIGS. 15A and 15B are diagrams illustrating an example in which an operation of the electronic device is applied according to various embodiments.
Figure 15B:
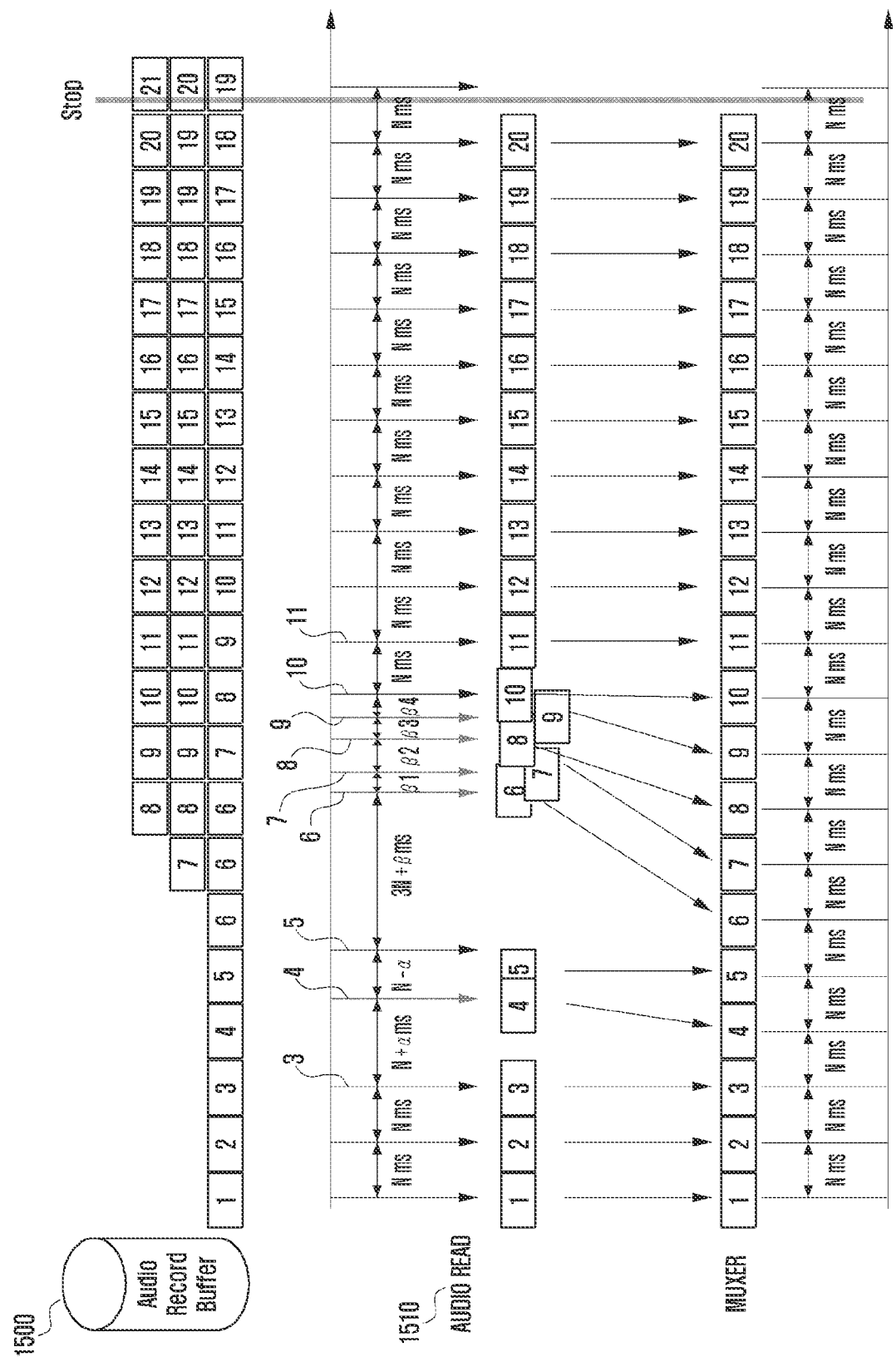
Figure 16A:
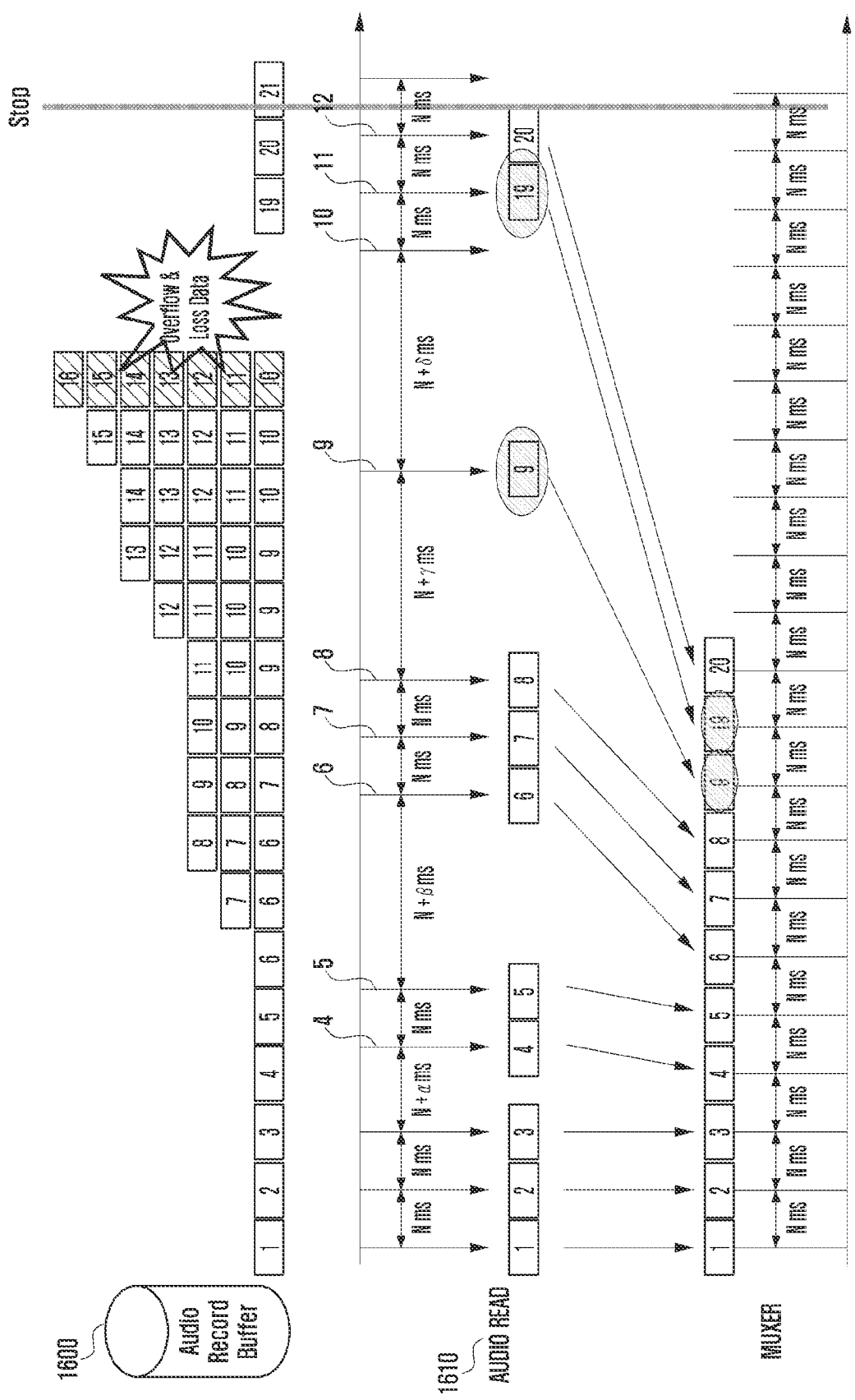
FIGS. 16A, 16B and 16C are diagrams illustrating an example in which an operation of the electronic device is applied according to various embodiments.
Figure 16B:
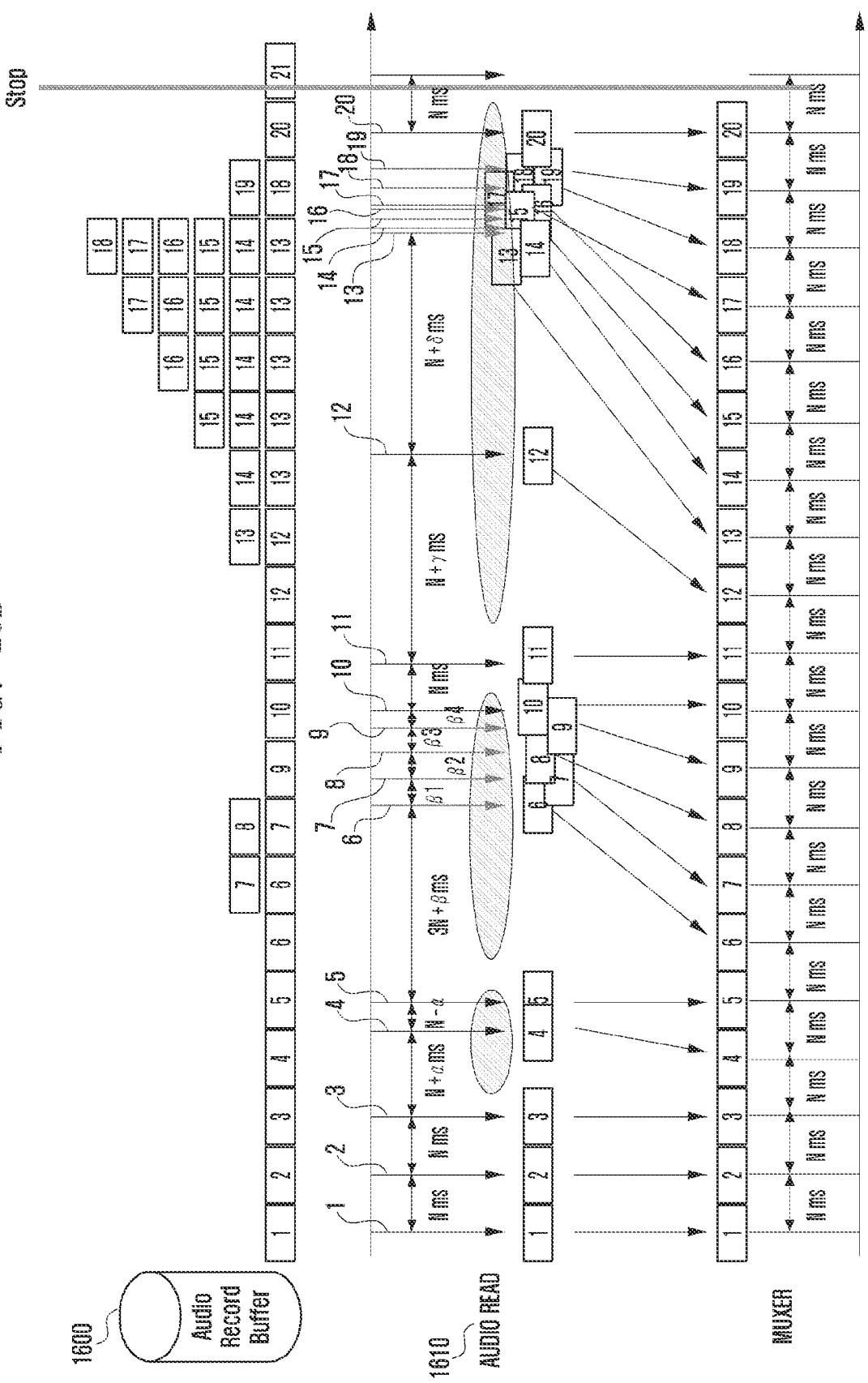
Figure 16C:
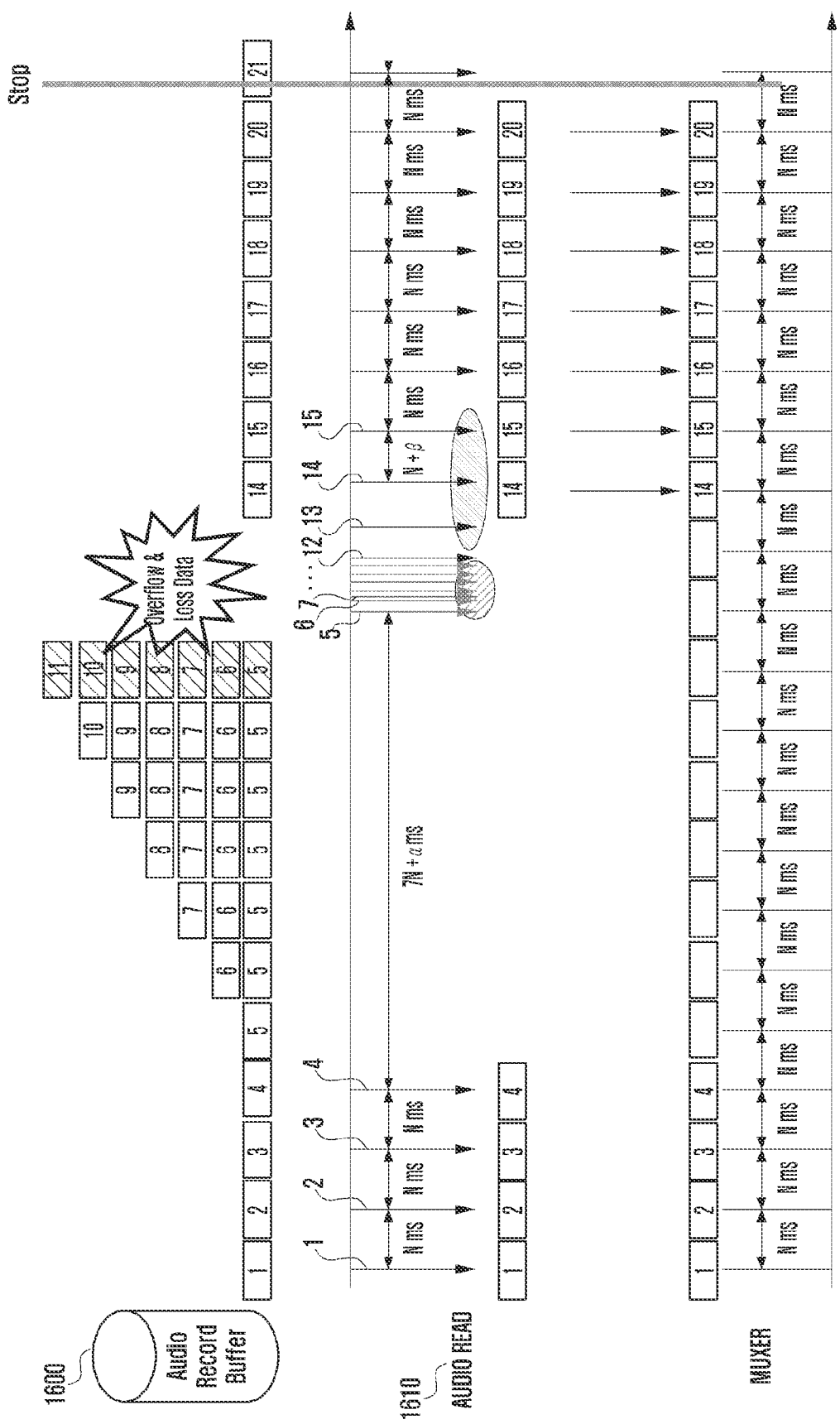

FIGS. 14A, 14B and 14C are diagrams illustrating examples which an operation of an electronic device (for example, the electronic device 101 of FIG. 1) according to various embodiments is applied compared to a comparative example. FIGS. 15A and 15B are diagrams illustrating an example in which an operation of an electronic device (for example, the electronic device 101 of FIG. 1) according to various embodiments is applied compared to a comparative example. FIGS. 16A, 16B and 16C are diagrams illustrating an example in which an operation of an electronic device (for example, the electronic device 101 of FIG. 1) according to various embodiments is applied compared to a comparative example.

According to an embodiment, for example, a processor (for example, the processor 120 of FIG. 1) of the electronic device 101 may perform the screen recording function for content reproduced in the electronic device 101 on the basis of hierarchical architecture as implemented in FIG. 4 according to load and execution of a program (for example, the program 140 of FIG. 1 or FIG. 2).

An audio read module 1410 (for example, the read task module 610 of FIG. 6) according to an embodiment may perform, for example, functions of a processor (for example, the processor 120 of FIG. 1) and/or an audio recording manager (for example, the audio recording manager 426 of FIG. 4).

According to an embodiment, the processor 120 may be configured to generate a task command (read task (RT)) at predetermined time intervals, for example, every N ms according to a predetermined schedule and call the task of reading and encoding the audio segments from the audio buffer.

According to an embodiment, audio data stream received for encoding audio data according to the performance of the screen recording function for content may be divided into segments (hereinafter, referred to as audio segments) having a predetermined size and sequentially input into the audio buffer 1400.

According to an embodiment, the audio buffer 1400 may be implemented to have a predetermined size (for example, size enough to store 6 audio segments) in consideration of encoding efficiency and/or resource efficiency. Audio segments stored in the audio buffer 1400 may be output from the audio buffer 1400 in response to the sequentially output task calls and may be encoded. A task schedule (task scheduling) including the orders and intervals of the generation of task calls may be pre-designated and determined on the basis of various conditions for performing the screen recording function such as features of resources, content, and/or audio data of the electronic device 101.

According to the comparative example of FIG. 14A, the RTs may be sequentially called and received at the time intervals (N ms) according to each task schedule in the order of RT calls such that a first RT (1) is at a first time point (0) according to the schedule, a second RT (2) is at a second time point (1N ms) according to the schedule, a third RT (3) is at a third time point (2N ms) according to the schedule, and a fourth RT (4) is at a fourth time point (3N ms) according to the schedule. In response to each of the read tasks, each of the audio segments input into the audio buffer may be encoded. As the RTs are received according to the task schedules without any delay and the audio segments are input into the audio buffer without any delay, audio and video data may be synchronized when multiplexing (mux) with recorded video encoding data is performed.

Referring to FIG. 14B, the RTs may be sequentially called and received in the order of RT calls according to a comparative embodiment such that a fourth RT (4) is received at a fourth time point (3N+α) delayed from a time point (3N ms) according to a schedule and a fifth RT (5) is received at a fifth time point (4N+α) after a scheduled time period from the fourth time point after the first RT (1) is received at the first time point (0) according to the schedule, the second RT (2) is received at the second time point (1N ms) according to the schedule, and the third RT (3) is received at the third time point (2N ms) according to the schedule. In response to each of the read tasks, the audio segments input into the audio buffer may be delayed by the fourth RT (4) and then encoded. As the audio segments are not lost in spite of the delay of the fourth RT (4), audio and video data may be synchronized when recorded content is reproduced.

Referring to FIG. 14C to which the screen recording function of the electronic device 101 according to various embodiments is applied, after the first RT (1) is received at the first time point (1) according to the schedule, the second RT (2) is received at the second time point (1N ms) according to the schedule, and the third RT (3) is received at the third time point (2N ms) according to the schedule, the fourth RT (4) is called at a time point delayed from the time point (3N ms) according to the schedule and may be received at a fourth time point (3N+α). Thereafter, the fifth RT (5) may be called and received at a scheduled fifth time point (4N). Accordingly, encoding RTs for audio segments input into the audio buffer after the fifth RT (5) may be received and performed at the scheduled time. Therefore, the audio segments are not lost in spite of the delay of the fourth RT (4), and audio and video data can be synchronized when recorded content is reproduced according to no delay of RTs thereafter.

According to the comparative embodiment of FIG. 15A, in the order of RT calls, the first RT (1) may be received and performed at the first time point (0) according to the schedule, the second RT (2) may be received and performed at the second time point (1N ms) according to the schedule, the third RT (3) may be received and performed at the third time point (2N) according to the schedule, the fourth RT (4) may be somewhat delayed and received at the fourth time point (3N+α ms) according to the call, the fifth RT (5) may be performed at the fifth time point (4N+α ms) after the period according to the schedule, and a sixth RT (6) may be delayed for a time (3N+β ms) long then the time interval (N ms) according to the task schedule and then received.

In response to each of the read tasks, a plurality of audio segments input into the audio buffer 1500 between the fifth RT (5) and the sixth RT (6) may be lost during a process of encoding each of the audio segments input into the audio buffer 1500, and accordingly audio data has been lost and the audio segments currently existing in the audio buffer 1500 are encoded and a time stamp is assigned to the encoded audio segments in the sixth RT (6), and thus audio and video data cannot be synchronized when multiplexing (mux) with recorded video encoding data is performed since and audio segments 18, 19, and 20 may not exist in the latter part of the video.

Referring to FIG. 15B, the first RT (1) may be received and performed at the first time point (0) according to the schedule, the second RT (2) may be received and performed at the second time point (1N ms) according to the schedule, the third RT (3) may be received and performed at the third time point (2N) according to the schedule, the fourth RT (4) may be somewhat delayed and received at the fourth time point (3N+α ms) according to the call, the fifth RT (5) may be received and performed at the fifth time point (4N ms) according to the schedule, and the sixth RT (6) may be delayed for a time (3N+β ms) longer than the time interval (N ms) according to the task schedule and then received, sequentially according to the schedules of RTs according to various embodiments.

According to various embodiments, the sixth RT (6) may be delayed for a predetermined time (3N+β ms) and called and received at a controlled time point, and the corresponding audio segment (6) may be encoded. Thereafter, a seventh RT (7) may be called at a controlled time point according to a controlled period (for example, β1) equal to or shorter than the predetermined period according to the schedule, an eighth RT (8) may be called at a controlled time point according to a controlled period (for example, β2) equal to or shorter than the predetermined period according to the schedule, and a ninth RT (9) may be called at a controlled time point according to a controlled period (for example, β3) equal to or shorter than the predetermined period according to the schedule, and thus the corresponding audio segments may be encoded according to the respective RTs. Thereafter, RTs from a tenth RT (10) can be called without any delay, and accordingly, audio segments corresponding thereto may be encoded.

According to various embodiments, the RTs may be called at the controlled time points to prevent and/or reduce the audio segments input into the audio buffer 1500 from belong lost. The called and received RTs may be called at the controlled time points and may output and encode audio segments existing in the audio buffer 1500 and assign time stamps according to the absolute time reference to the encoded audio segments according to the number of accumulated RTs.

According to various embodiments, when audio data is multiplexed (mux) with recorded video data during the audio data is recorded, audio and video data can be synchronized according to the absolute time reference.

According to the comparative embodiment of FIG. 16A, the first RT (1) may be received and performed at the first time point (0) according to the schedule, the second RT (2) may be received and performed at the second time point (1N ms) according to the schedule, the third RT (3) may be received and performed at the third time point (2N) according to the schedule, and the fourth RT (4) may be somewhat delayed and received at the fourth time point (3N+α ms) according to the call in the order of RT calls. After the fifth RT (5), the sixth RT (6) may be delayed for a time (N+β ms) longer than or equal to the time interval (N ms) according to the task schedule, the ninth RT (9) may be delayed for a time (N+γ ms), and the tenth RT (10) may be delayed for a time (N+δ ms).

In response to each of the read tasks, a plurality of audio segments input into the audio buffer 1600 between the fifth RT (5) and the sixth RT (6) may be lost during a process of encoding each of the audio segments input into the audio buffer 1600, and a plurality of audio segments may be also lost between the eighth RT (8) and the ninth RT (9). Further, overflow may be generated in the audio buffer 1600 between the ninth RT (9) and the tenth RT (10) and the audio segments may be lost at a time during a process of restoring the audio buffer 1600. Accordingly, considerably much audio data has been lost and time stamps are assigned in the order of encoded audio segments without consideration of the lost audio segments or the RTs which have not been called according to the schedules, and thus audio and video data cannot be synchronized when multiplexing (mux) with recorded video data is performed and the content may be silent since there is no audio segment corresponding to the latter part of the video.

Referring to FIG. 16B, according to various embodiments, the first RT (1) may be received and performed at the first time point (0) according to the schedule, the second RT (2) may be received and performed at the second time point (1N ms) according to the schedule, the third RT (3) may be received and performed at the third time point (2N) according to the schedule, the fourth RT (4) may be somewhat delayed and received at the fourth time point (3N+α ms), the fifth RT (5) may be received and performed at the fifth time point (4N ms) according to the schedule, and the sixth RT (6) may be delayed for a time (3N+β ms) longer than or equal to the time interval (N ms) according to the task schedule and then received, sequentially according to the schedules of the RTs.

According to various embodiments, the sixth RT (6) may be delayed for a predetermined time (3N+β ms) and called and received at a controlled time point, and the corresponding audio segment (6) may be encoded. Thereafter, the seventh RT (7) may be called at the controlled time point according to the controller period (for example, β1) equal to or shorter than the predetermined period, the eighth RT (8) may be called at the controlled time point according to the controller period (for example, β2) equal to or shorter than the predetermined period, the ninth RT (9) may be called at the controlled time point according to the controller period (for example, β3) equal to or shorter than the predetermined period, and the tenth RT (10) may be called at the controlled time point according to the controller period (for example, β4) equal to or shorter than the predetermined period, and thus the corresponding audio segments may be encoded according to the RTs. Thereafter, RTs from an eleventh RT (11) can be called at the scheduled time point without any delay, and accordingly, audio segments corresponding thereto may be encoded.

According to various embodiments, a twelfth RT (12) may be delayed for a time (N+γ ms) after the time point at which the eleventh RT (11) is received and called and received at a controlled time point, and the corresponding audio segment (12) may be encoded. Thereafter, a thirteenth RT (13) may be delayed for a time (N+δ ms) after the time point at which the twelfth RT (12) is received and called and received at a controlled time point, and the corresponding audio segment (13) may be encoded. Thereafter, a fourteenth RT (14) to a twentieth RT (20) may be frequently called and performed, according to a period equal to or shorter than the scheduled RT period, at controlled time points according to controlled periods equal to or shorter than the predetermined period according to the schedule.

According to various embodiments, the RTs may be called at the controlled time points to prevent and/or reduce the audio segments input into the audio buffer 1600 from belong lost. The called and received RTs may be called at the controlled time points and may output and encode audio segments existing in the audio buffer 1600 and assign time stamps according to the absolute time reference to the encoded audio segments according to the number of accumulated RTs.

According to various embodiments, it is possible to prevent and/or reduce overflow of the audio buffer and thus prevent and/or reduce audio data from being lost by variously controlling time points at which RTs are called when audio data is recorded.

According to various embodiments, when audio data is not lost during audio recording and is multiplexed (mux) with recorded video data, audio and video data can be synchronized according to the absolute time reference.

Referring to FIG. 16C, according to various embodiments, after the first RT (1) to the fourth RT (4) are called and performed at time points according to the schedules, sequentially according to the schedules of the RTs, reception of the fifth RT (5) is significantly delayed and called and performed at a fifth time point (7N+α ms). In this case, according to the excessive delay of reception of the fifth RT (5), overflow is generated in the audio buffer 1600 and some pieces of data are lost, but the sixth RT (6) to the twelfth RT (12) may be frequently called and performed at the controlled time points according to the controlled periods equal to or shorter than the scheduled task periods. There is no audio segment and no recoding is performed in the thirteenth RT (13), but audio segments can be normally performed from the fourteenth RT (14) and time stamps according to the absolute reference indicating that RTs according to the schedules are sequentially accumulated may be assigned.

According to various embodiments, even when reception of RTs are excessively delayed due to hardware or software problems of the electronic device 101, it is possible to reduce loss of audio data and, even though the audio data is lost, assign time stamps according to the absolute reference to encoded audio segments, and thus audio and video data can be synchronized according to the absolute time reference when multiplexing with recorded video data is performed.

According to an example embodiment, a method of operating an electronic device (for example, the electronic device 101 of FIG. 1) may include: identifying a schedule for sequentially receiving read tasks (RTs) at a specified time interval to encode audio segments sequentially input in a specified size into an audio buffer from audio data of content according to execution of an application, identifying at least one of a situation in which the RTs are received according to the schedule and an audio buffer state, and controlling time points at which the RTs are called, based on at least one of the situation in which the RTs are received according to the schedule and the audio buffer state.

According to various example embodiments, the method may further include encoding the audio segments corresponding to the RTs received at the controlled time points.

According to various example embodiments, the method may further include generating time stamps of the encoded audio segments according to an absolute time reference based on orders of the RTs output at the specified time interval according to the schedule for encoding the audio data.

According to various example embodiments, the method may further include generating a packet including the encoded audio segments and inserting the time stamps into a header of the packet.

According to various example embodiments, the identifying operation may include identifying whether there are the audio segments in the audio buffer at the time point at which the RT is received, and the controlling operation may include controlling the time points at which the RT is called before a time point at which a next RT scheduled after the RT is received and calling the RT at the controlled time point.

According to various example embodiments, based on the audio segments not being received at the controlled time point, reception of the audio segments according to the call of the RT may be repeatedly attempted before the time point at which the next RT is received.

According to various example embodiments, the method may further include, based on the RT being received based on the schedule, identifying whether a previous RT scheduled before the RT is on standby, and the controlling operation may include, based on the previous RT being on standby, controlling the time point at which the RT is called to be a time point after the time point at which the previous RT is called and making the RT stand by.

According to various example embodiments, based on the previous RT being called and performed while the RT is on standby, the controlling operation may include controlling the time point at which the RT is called to have a time interval shorter than the specified time interval after the time point at which the previous task is performed.

According to various example embodiments, the method may further include identifying whether a time point at which a next RT according to the schedule is received arrives at the controlled time point at which the RT is called, and based on the time point at which the next RT according to the schedule is received arriving at the controlled time point at which the RT is called, the time point at which the next RT is called to be a time point may be controlled after the time point at which the RT is received.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a display configured to output image data of content based on execution of an application;
   a sound output module comprising circuitry configured to output audio data of the content;
   memory storing instructions; and
   a processor including processing circuitry adaptively connected to the display and the sound output module,
   wherein the instructions, when executed by the processor, cause the electronic device to:
   identify a schedule for sequentially receiving read tasks (RTs) at a specified time interval to encode audio segments sequentially input in a specified size into an audio buffer from the audio data,
   control time points at which the read tasks are called based on at least one of the read tasks being received according to the schedule and an audio buffer state, the read tasks comprising a current read task, a previous read task in standby, and a next read task,
   based on the current read task being received according to the schedule, identify whether the previous read task scheduled before the current read task is on standby, and based on the previous read task being on standby, control the time point at which the current read task is called to be a time point after the time point at which the previous read task is called and make the current read task stand by, and
   encode the audio segments corresponding to the read tasks received at the controlled time points to maintain synchronization between the output audio data and the output image data.

2. The electronic device of claim 1, wherein the instructions, when executed by the processor, cause the electronic device to:
   generate time stamps of the encoded audio segments based on an absolute time reference based on orders of the RTs output at the specified time interval based on the schedule for encoding the audio data.

3. The electronic device of claim 1, wherein the instructions, when executed by the processor, cause the electronic device to:
   identify whether there are the audio segments in the audio buffer at the time point at which the current RT is received, and
   control the time points at which the current RT is called before a time point at which the next RT is received, call the current RT at the controlled time point, and attempt reception of the audio segments from the audio buffer.

4. The electronic device of claim 3, wherein the instructions, when executed by the processor, cause the electronic device to:
   based on the audio segments not being received at the controlled time point, reception of the audio segments according to the call of the current RT is repeatedly attempted before the time point at which the next RT is received.

5. The electronic device of claim 1, wherein the instructions, when executed by the processor, cause the electronic device to:
   based on the previous RT being called and performed while the current RT is on standby, control the time point at which the current RT is called to have a time interval shorter than the specified time interval after the time point at which the previous task is performed.

6. The electronic device of claim 1, wherein the instructions, when executed by the processor, cause the electronic device to:
   based on a time point at which the next RT according to the schedule is received arriving at the controlled time point at which the current RT is called, control the time point at which the next RT is called to be a time point after the time point at which the current RT is received.

7. A method of operating an electronic device including a display that outputs image data of content based on execution of an application and sound output circuitry that outputs audio data of the content, the method comprising:
   identifying a schedule for sequentially receiving read tasks (RTs) at a specified time interval to encode audio segments sequentially input in a specified size into an audio buffer from audio data of content based on execution of the application;
   identifying at least one of the read task being received according to the schedule and an audio buffer state;
   controlling time points at which the read tasks are called, based on at least one of the read tasks being received according to the schedule and an audio buffer state, the read tasks comprising a current read task, a previous read task in standby, and a next read task,
   based on the current read task being received according to the schedule, identifying whether the previous read task scheduled before the current read task is on standby, and based on the previous read task being on standby, controlling the time point at which the current read task is called to be a time point after the time point at which the previous read task is called and make the current read task stand by, and
   encoding the audio segments corresponding to the read tasks received at the controlled time points to maintain synchronization between the output audio data and the output image data.

8. The method of claim 7, further comprising encoding the audio segments corresponding to the RTs received at the controlled time points.

9. The method of claim 7, further comprising: generating time stamps of the encoded audio segments based on an absolute time reference based on orders of the RTs output at the specified time interval according to the schedule for encoding the audio data.

10. The method of claim 9, further comprising generating a packet comprising the encoded audio segments and inserting the time stamps into a header of the packet.

11. The method of claim 7, wherein the identifying comprises:
   identifying whether there are the audio segments in the audio buffer at the time point at which the current RT is received, and
   the controlling comprises: controlling the time points at which the current RT is called before a time point at which the next RT scheduled after the current RT is received and calling the current RT at the controlled time point.

12. The method of claim 11, wherein, based on the audio segments not being received at the controlled time point, reception of the audio segments according to the call of the current RT is repeatedly attempted before the time point at which the next RT is received.

13. The method of claim 7, wherein, based on the previous RT being called and performed while the current RT is on standby, the controlling comprises controlling the time point at which the current RT is called to have a time interval shorter than the specified time interval after the time point at which the previous task is performed.

14. The method of claim 7, further comprising: identifying whether a time point at which a next RT according to the schedule is received arrives at the controlled time point at which the current RT is called, and
   based on the time point at which the next RT according to the schedule is received arriving at the controlled time point at which the current RT is called, the time point at which the next RT is called is controlled to be a time point after the time point at which the current RT is received.

15. A non-transitory computer-readable storage medium having recorded thereon a program which, when executed, causes performance of operations by an electronic device including a display that outputs image data of content based on execution of an application and sound output circuitry that outputs audio data of the content, the operations comprising:
   identifying a schedule for sequentially receiving read tasks (RTs) at a specified time interval to encode audio segments sequentially input in a specified size into an audio buffer from audio data of content based on execution of the application;
   identifying at least one of the read task being received according to the schedule and an audio buffer state;
   controlling time points at which the read tasks are called, based on at least one of the read tasks being received according to the schedule and an audio buffer state, the read tasks comprising a current read task, a previous read task in standby, and a next read task,
   based on the current read task being received according to the schedule, identifying whether the previous read task scheduled before the current read task is on standby, and based on the previous read task being on standby, controlling the time point at which the current read task is called to be a time point after the time point at which the previous read task is called and make the current read task stand by, and
   encoding the audio segments corresponding to the read tasks received at the controlled time points to maintain synchronization between the output audio data and the output image data.

16. The storage medium of claim 15, wherein the identifying comprises: identifying whether there are the audio segments in the audio buffer at the time point at which the current RT is received, and
   the controlling comprises: controlling the time points at which the current RT is called before a time point at which the next RT scheduled after the current RT is received and calling the current RT at the controlled time point.

17. The storage medium of claim 16, wherein, based on the audio segments not being received at the controlled time point, reception of the audio segments according to the call of the current RT is repeatedly attempted before the time point at which the next RT is received.

* * * * *